United States Patent
Imada

(10) Patent No.: US 6,208,810 B1
(45) Date of Patent: *Mar. 27, 2001

(54) IMAGE BLUR PREVENTING DEVICE

(75) Inventor: Shinji Imada, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,423

(22) Filed: Jan. 27, 1998

(30) Foreign Application Priority Data

Jan. 28, 1997 (JP) .................................................. 9-027356
Jan. 28, 1997 (JP) .................................................. 9-027357

(51) Int. Cl.$^7$ .................................................. G03B 17/00
(52) U.S. Cl. .................................................. 396/55
(58) Field of Search ...................... 396/55, 208; 348/208

(56) References Cited

U.S. PATENT DOCUMENTS

| | | | |
|---|---|---|---|
| 5,615,397 | 3/1997 | Shiomi et al. ......................... | 396/55 |
| 5,740,470 | * 4/1998 | Kitagawa et al. .................. | 396/55 X |
| 5,761,546 | * 6/1998 | Imada ...................................... | 396/55 |
| 5,826,115 | * 10/1998 | Washisu et al. ........................ | 396/55 |
| 5,845,156 | * 12/1998 | Onuki ................................. | 396/55 X |

* cited by examiner

Primary Examiner—W. B. Perkey
(74) Attorney, Agent, or Firm—Fitzpatrick, Cella, Harper & Scinto

(57) ABSTRACT

An image blur preventing device comprises a movable lens movable in a first direction and in a second direction different from the first direction for image blur prevention, a driving device for driving the movable portion according to a vibration signal varying in response to the detection output of a vibration sensor for detecting the vibration state of the device, and a regulating portion for regulating the movable range of the movable portion to a predetermined range by regulating the drive of the driving device in response to the vibration signal, thereby achieving regulation of the movable range in such a manner as to set a first range in the first direction and to set a second range, different from the first range, in the second direction, thereby enabling image blur prevention in all the directions.

17 Claims, 30 Drawing Sheets

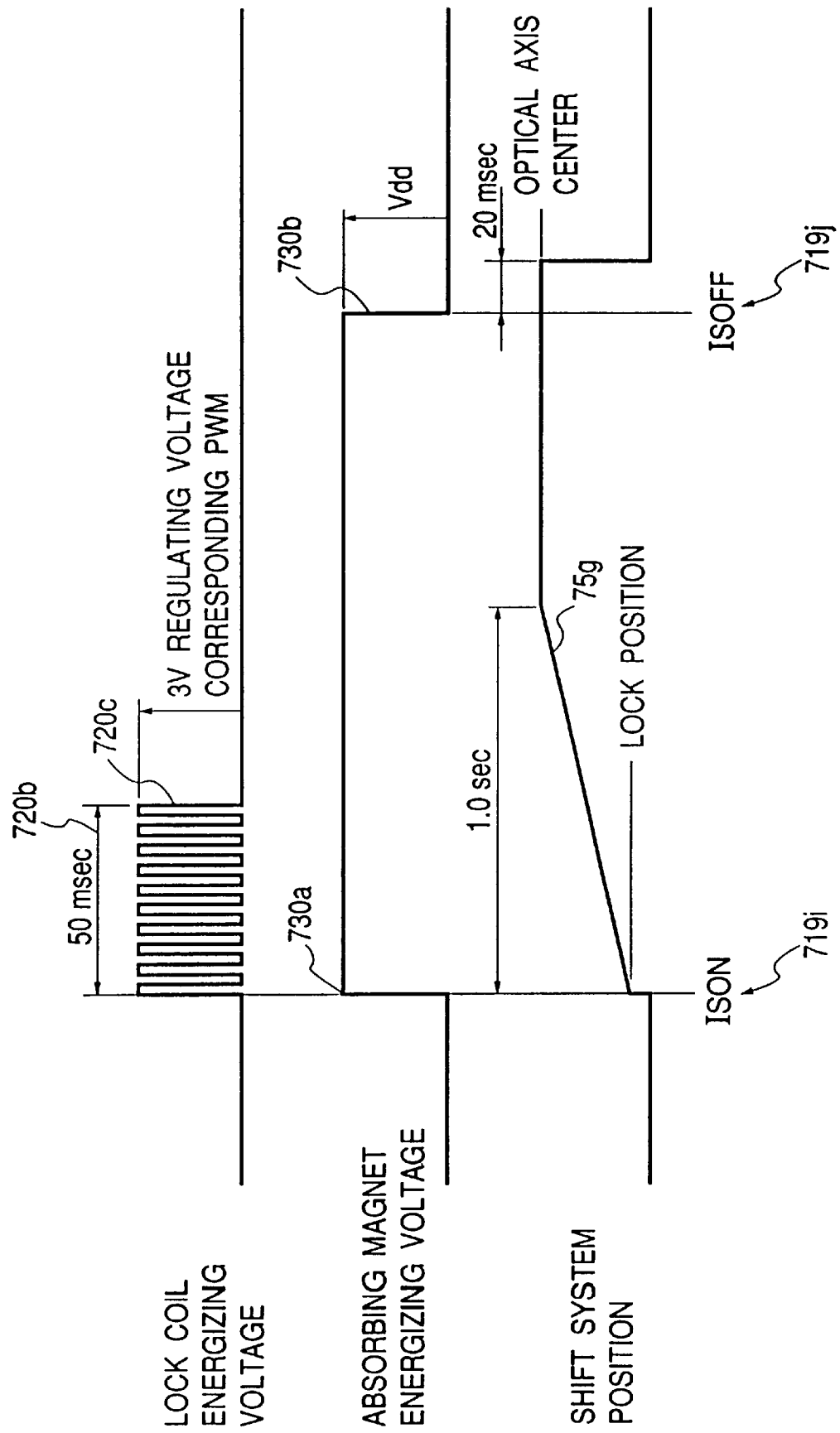

IMAGE BLUR PREVENTING DEVICE

BACKGROUND OF THE INVENTION

1. Field of the Invention

The present invention relates to an image blur preventing device for preventing image blur resulting, for example, from hand vibration in a camera, an optical instrument or the like.

2. Related Background Art

In recent cameras, the possibility of failure in photograph taking is quite low even for an amateur who is not skilled in the manipulation of the camera, because important operations for photograph taking such as determination of the exposure and focusing are all automated.

Also, systems have been developed for preventing interference of hand vibration to the camera, so that few factors inducing the failure in photograph taking are left on the part of the photographer.

In the following there will be briefly explained such system for preventing hand vibration.

Vibration of the camera induced by hand vibration during photograph taking usually has a frequency of 1 to 12 Hz. The basic principle for providing a photograph without image blur even in the presence of such hand vibration when the shutter is released consists of detecting the vibration of the camera induced by such hand vibration and displacing a correction lens in response to the detected amount. Therefore, in order to obtain a photograph without image blur even in the presence of a camera vibration, it is necessary to first precisely detect the vibration of the camera and then to correct the change in the optical axis resulting from such vibration.

The detection of such vibration (camera vibration) can in principle be achieved by providing the camera with vibration detection means (e.g., a sensor) for detecting an angular acceleration, an angular velocity or an angular variation, and camera vibration detection means for outputting the angular variation by electrically or mechanically integrating the output signal of the sensor. The image vibration can be suppressed by driving a correcting optical device, for deviating the photographing optical axis, based on the detected information.

A vibration preventing system employing such a vibration detection means now is described with reference to FIG. 18.

FIG. 18 shows a system for suppressing the image blur resulting from a pitching vibration 81p and a yawing vibration 81y of the camera, indicated by arrows 81.

In FIG. 18, there are shown a lens barrel 82; vibration detection means 83p, 83y for respectively detecting pitching and yawing vibrations of the camera, with respective vibration detecting directions 84p, 84y; and an optical correction device 85 (with coils 87p, 87y for applying driving forces to the optical correction device 85 and position detectors 86p, 86y for detecting the position of correction device 85). The optical correction device 85 is provided with a position control loop to be explained later, and is driven with the outputs of the vibration detection means 83p, 83y as target values thereby achieving stabilization on the image plane 88.

FIG. 19 is an exploded perspective view of an image blur correction device (composed of the above-mentioned vibration detection means, optical correction device, coils, position detectors and various IC's to be explained later) adapted for use for the above-mentioned object. The structure of this device will be explained with reference to FIGS. 19 to 28.

A base plate 71 (shown in FIG. 22 in magnified manner) is provided with three rear projections 71a (one being not visible) which are fitted on an unrepresented lens barrel, and are fixed thereto by screwing of known lens barrel rollers or the like into holes 71b.

A second yoke 72, composed of a magnetic material and provided with metal plating is fixed to holes 71c of the base plate 71 by screws passing through holes 72a. Permanent magnets (shifting magnets) 73 such as neodymium magnets are magnetically adhered to the second yoke 72. The permanent magnets 73 are respectively magnetized in directions indicated by arrows 73a shown in FIG. 19.

In a support frame 75 (shown in FIG. 23 in magnified manner), in which a correction lens 74 is fixed with C-rings or the like, coils (shifting coils) 76p, 76y are fixed by forced fitting (FIG. 23 showing an unfixed state), and light emitting elements 77p, 77y such as IRED's are also adhered to the rear face of the support frame 75, whereby the emitted lights pass through slits 75ap, 75ay and enter position detecting elements 78p, 78y such as PSD's to be explained later.

In three holes 75b of the support frame 75, there are inserted support balls 79a, 79b with spherical ends, composed for example of POM (polyacetal resin), and charging springs 710 (cf. FIGS. 20 and 21A), and the support balls 79a are fixed to the support frame 75 by heat caulking (support balls 79b being rendered slidable in the direction of holes 75b, against the force of the charging springs 710).

FIG. 20 is a longitudinal cross-sectional view of the image vibration correction device after assembling thereof. In each hole 75b of the support frame 75, there are inserted in succession, in a direction 79c, the support ball 79b, the charged spring 710 and the support ball 79a (support balls 79a and 79b being identical in shape), and the peripheral edge 75c of the hole 75b is finally heat caulked to retain the support ball 79a.

FIG. 21A is a cross-sectional view of the hole 75b in a direction perpendicular to the plane of FIG. 20, and FIG. 21B is a plan view of the hole 75b seen from a direction 79c. In FIG. 21A, symbols A to D indicate depths of areas A to D shown in FIG. 21B.

As the rear end of a fin portion 79aa of the support ball 79a is received and limited by an area of the depth A, the support ball 79a is fixed to the support frame 75 by the heat caulking of the peripheral edge 75a.

Also as the front end of a fin portion 79ba of the support ball 79b is received and limited by an area of the depth B, the support ball 79b cannot escape, under the force of the charging spring 710, from the hole 75b in a direction 79c.

After the assembling of the image blur correcting device, the support ball 79b is received by the second yoke 72 as shown in FIG. 20 and cannot escape from the support frame 75, but the escape preventing area B is provided in consideration of convenience of assembling.

As the shape of the hole 75b of the support frame 75, as illustrated in FIGS. 20, 21A and 21B, does not require, in the molding of the support frame 75, a complex mold but can be prepared with a simple two-part mold in which a part is extracted in a direction opposite to the arrow 79c, so that the dimensional precision can be strictly defined.

Also as the support balls 79a, 79b are identical in shape, it is rendered possible to reduce the cost of the parts, to avoid errors in assembling and to facilitate management of the parts.

In a bearing portion 75d of the support frame 75, there is coated for example fluorinated grease, and an L-shaped shaft 711 (made of non-magnetic stainless steel) is inserted therein (cf. FIG. 19). The other end of the L-shaped shaft 711 is inserted into a bearing portion 71d (similarly coated with grease) of the base plate 71, and the support frame 75 is placed in the base plate 71, with three support balls 79b riding on the second yoke 72.

Then three positioning holes 712a of a first yoke 712 shown in FIG. 19 are fitted on three pins 71f, shown in FIG. 22, of the base plate 71, and the first yoke 712 is received by five receiving faces 71e, shown in FIG. 22, and is magnetically coupled, by the magnetic force of the magnets 73, to the base plate 71.

In this manner the rear face of the first yoke 712 comes into contact with the support balls 79a, and, as shown in FIG. 20, the support frame 75 is sandwiched between the first yoke 712 and the second yoke 72 and is defined in position in the axial direction.

Fluorinated grease is also coated in the contact portions between the support balls 79a, 79b and the first and second yokes 712, 72 so that the support frame 75 is rendered freely slidable with respect to the base plate 71, in a plane perpendicular to the optical axis.

The L-shaped shaft 711 supports the support frame 75 so as to be slidable only in the directions 713p, 713y with respect to the base plate 71, whereby the support frame 75 is prevented from rotation (rolling) about the optical axis with respect to the base plate 71.

The L-shaped shaft 711 has a large fitting play with the bearing portions 71d, 75d in the axial direction, thereby avoiding interference with the limitation in the axial direction by sandwiched supporting by the support balls 79a, 79b and the first and second yokes 712, 72.

On the surface of the first yoke 712 there is provided an insulating sheet 714, on which a hard circuit board 715 with plural IC's (position detectors 78p, 78y, an output amplifying IC, coils 76p, 76y, a driving IC etc.) is fixed by fitting two positioning holes 715a thereof on two pins 71h of the base plate 71, shown in FIG. 22, fitting screws through holes 715b, holes 712b of the first yoke 712 and holes 71g of the base plate 71.

On the hard circuit board 715, the position detectors 78p, 78y are positioned with a jig and soldered, and a signal transmitting flexible circuit board 716 is also attached to the rear face of the hard circuit board 715 by heat pressing a face 716a of the flexible board 716 to a broken-lined area 715c (cf. FIG. 19).

From the flexible circuit board 716, there extend a pair of arms 716bp, 716by in a plane perpendicular to the optical axis, and respectively engage with hooking portions 75ep, 75ey of the support frame 75 (cf. FIG. 23), and the terminals of the light emitting elements 77p, 77y and those of the coils 76p, 76y are soldered thereto.

Thus the light emitting elements 77p, 77y such as IRED's and the coils 76p, 76y are driven by the hard circuit board 715 through the flexible circuit board 716.

The arms 716bp, 716by of the flexible circuit board 716 are respectively provided with bent portions 716cp, 716cy (cf. FIG. 19), and the elasticity of such bent portions reduces the load of the arms 716bp, 716by when the support frame 75 moves in a plane perpendicular to the optical axis.

The first yoke 712 is provided with a molded protruding face 712c, which passes through a hole 714a of the insulating sheet 714 and is in direct contact with the hard circuit board 715. The hard circuit board 715 is provided, on the contact face thereof, with a ground pattern, so that the first yoke 712 is grounded by screwing the hard circuit board 715 to the base plate and is thus prevented from functioning as an antenna which generates and transmits noise to the hard circuit board 715.

A mask 717 shown in FIG. 19 is positioned by pins 71h of the base plate 71 and is adhered, by a double-stick tape, to the hard circuit board 715.

The base plate 71 is provided with a hole 71i for passing the permanent magnet (cf. FIGS. 19 and 22), through which the rear face of the second yoke 72 is exposed. A permanent magnet (locking magnet) 718 is fitted in this hole 71i and is magnetically coupled with the second yoke 72 (cf. FIG. 20).

A locking ring 719 (cf. FIGS. 19, 20 and 24) is provided with a coil (locking coil) 720 adhered thereto, and, behind an ear portion 719a of the locking ring 719 there is provided a bearing 719b (cf. FIG. 25). An armature pin 721 (cf. FIGS. 19 and 25) passes through in succession an armature-rubber 722, the bearing 719b and an armature spring 723 and is fitted in and fixed to an armature 724 by caulking.

Consequently the armature 724 can slide in a direction 725 with respect to the locking ring 719, against the charging force of the armature spring 723.

FIG. 25 is a plan view showing the vibration correcting device in assembled state, seen from the rear side of FIG. 22. The locking ring 719 is mounted to the base plate 71 by known bayonet coupling by fitting three external recesses 719c of the locking ring 719 with three internal projections 71j of the base plate 71, thus pressing the locking ring 719 into the base plate 71 in this state and then rotating the locking ring 719 in the clockwise direction.

Consequently the locking ring 719 is rotatable about the optical axis, with respect to the base plate 71. In order to prevent de-coupling of the bayonet coupling by the rotation of the locking ring 719 to a position where the recesses 719c thereof match the projections 71j, a locking rubber 726 (cf. FIGS. 19 and 25) is pressed into the base plate 71 in such a manner that the locking ring 719 can only rotate by an angle θ of a notch 719d (cf. FIG. 25) which is limited by the locking rubber 726.

A magnetic locking yoke 727 (FIG. 19) is also provided with a permanent magnet (locking magnet) 718. Two holes 727a of the locking yoke are fitted with pins 71k (cf. FIG. 25) of the base plate 71, and screw couplings are made through two holes 727b and two holes 71n.

The permanent magnet 718 at the side of the base plate 71, the permanent magnet 718 at the side of the locking yoke 727, the second yoke 72 and the locking yoke 727 constitute a known closed magnetic circuit.

The locking rubber 726 mentioned above is retained in position by the screw coupling of the locking yoke 727. In FIG. 25, the locking yoke 727 is omitted for the purpose of clarity.

Between a hook 719e of the locking ring 719 and a hook 71m of the base plate 71 there is provided a locking spring 728 (cf. FIG. 25) thereby biasing the locking ring 719 clockwise. An attracting yoke 729 (cf. FIGS. 19 and 25) is provided with an attracting coil 730 and is screw coupled, by a hole 729a, with the base plate 71.

The terminals of the coil 720 and those of the attracting coil 730 are composed, for example, of teflon-coated twisted paired wires which are soldered to an end portion 716d of the flexible circuit board 716.

IC's 731p, 731y (cf. FIG. 19) provided on the hard circuit board 715 and serving to amplify the outputs of the position detectors 78p, 78y have an internal structure shown in FIG.

26, which only illustrates the structure of the IC 731p because IC's 731p, 731y have identical structure.

Referring to FIG. 26, current-voltage converting amplifiers 731ap, 731bp respectively convert the photocurrents 78i1p, 78i2p, which are generated in the position detector 78p (consisting of resistors R1, R2) by the light from the light emitting element 77p, into voltages, and a differential amplifier 731cp amplifies the difference of the outputs of the current-voltage converting amplifiers 731ap, 731bp.

The light emitted from the light emitting elements 77p, 77y is transmitted by slits 75ap, 75ay and enters the position detectors 78p, 78y as explained before, and the light entry positions thereto vary if the support frame 75 moves in a plane perpendicular to the optical axis.

The position detector 78p has sensitivity in a direction 78ap (cf. FIG. 19) while the slit 75ap is shaped so as to expand the light beam in a direction 78ay perpendicular to the arrow 78ap but limit the light beam in the direction 78ap. Consequently, the balance of the photocurrents 78i1p and 7812p varies only when the support frame 75 moves in a direction 713p, so that the differential amplifier 731cp generates an output corresponding to the position of the support frame 75 in the direction 713p.

Also the position detector 78y has sensitivity in a direction 78ay (cf. FIG. 19) while the slit 75ay is extended in a direction 78ap perpendicular to the arrow 78ay, so that the output of the position detector 78y varies only when the support frame 75 moves in a direction 713y.

An adding amplifier 731dp determines the sum of the outputs of the current-voltage converting amplifiers 731ap, 731bp (namely the total amount of light received by the position detector 78p), and a driving amplifier 731ep receiving such sum drives the light emitting element 77p accordingly.

The amount of light emitted by the light emitting element 77p fluctuates unstably, e.g., with temperature changes, thus the absolute value (78i1p+78i2p) of the photocurrents 78i1p, 78i2p from the position detector 78p also varies. For this reason, the output (78i1p−78i2p) of the differential amplifier 731cp, indicating the position of the support frame 75, also varies.

However, the fluctuation in the output of the differential amplifier 731cp can be canceled by controlling the light emitting element 77p by the above-mentioned driving circuit in the above-explained manner, such that the sum of the received light is maintained constant.

The coils 76p, 76y shown in FIG. 19 are positioned in the closed magnetic circuit constituted by the permanent magnets 73, the first yoke 712 and the second yoke 72, and a current supply to the coil 76p drives the support frame 75 in a direction 713p (according to the known Flemming's left hand rule) while a current supply to the coil 76y drives the support frame 75 in a direction 713y.

Thus, by driving coils 76p, 76y with the outputs of the position detectors 78p, 78y amplified by the IC's 731p, 731y, the support frame 75 is driven to vary the outputs of the position detectors 78p, 78y.

By selecting the driving directions (polarities) of the coils 76p, 76y so as to reduce the outputs of the position detectors 78p, 78y (negative feedback), the support frame 75 is stabilized by the driving forces of the coils 76p, 76y at a position where the outputs of the position detectors 78p, 78y become substantially zero.

Such a driving method by negative feedback of the outputs of the position detectors is called a position control method, and the support frame 75 can be quite faithfully driven according to a target value (for example an angular signal of hand vibration) supplied to the IC's 731p, 731y from the outside.

In practice, the outputs of the differential amplifiers 731cp, 731cy are supplied through the flexible circuit board 716 to a main board (not shown), and, after A/D conversion, stored in memory in a microcomputer.

In the microcomputer, these signals are compared with target values (hand vibration angular signal), amplified, then subjected to known phase advancement compensation according to a known digital filtering method (for stabilizing the position control), then supplied again through the flexible circuit board 716 to the IC 732 for driving the coils 76p, 76y. The IC 732 executes known PWM (pulse width modulation) drive of the coils 76p, 76y based on the entered signals, thereby driving the support frame 75.

The support frame 75 is freely slidable in directions 713p, 713y as explained before and is stabilized in position by the aforementioned position control method, but, in consumer equipment such as a camera, constant drive of the support frame 75 is not possible when the consumption of power supply is considered. However, the support frame 75 is freely movable in the uncontrolled state in the plane perpendicular to the optical axis, and may collide with the end of the structurally movable range (hereinafter called stroke limit position). This may generate noise or cause damage, and a countermeasure against such free movement must be provided.

For this purpose a locking mechanism for locking the support frame 75 is provided as will be explained in the following.

As shown in FIGS. 25, 27A and 27B, the support frame 75 is provided on the rear face thereof with three radial projections 75f, an end of each projection 75f fits into a respective internal periphery 719g of the locking ring 719 as shown in FIGS. 27A and 27B. Consequently the support frame 75 is restricted in all directions with respect to the base plate 71.

FIGS. 27A and 27B are plan views showing the functional relationship of the locking ring 719 and the support frame 75, showing only principal components extracted from FIG. 25. For the purpose of clarity, the layout is made somewhat different from the actual assembled state. In FIG. 27A, three cam portions 719f are in fact not provided over the entire cylindrical generatrix of the locking ring 719 as shown in FIGS. 20 and 24 and are therefore not visible in the direction of FIG. 25, but they are illustrated for the ease of understanding.

As shown in FIG. 20, the coil 720 (including twisted lead wires 720a in FIGS. 27A and 27B, passing along the external periphery of the locking ring 719 by a flexible circuit board (not shown) and connected from terminal 719h to terminals 716e on a shaft portion 716d of the flexible circuit board 716) is maintained in a closed magnetic circuit between the permanent magnets 718, and, upon receiving a current supply, generates a torque for rotating the locking ring 719 about the optical axis.

The coil 720 is controlled by an instruction signal supplied from a microcomputer (not shown) to the driving IC 733 on the hard circuit board 715 through the flexible circuit board 716 and is PWM driven by the IC 733.

Referring to FIG. 27A, the winding direction of the coil 720 is selected so that, upon energization thereof, an anticlockwise torque is generated in the locking ring 719, whereby the locking ring 719 rotates anticlockwise against the force of the locking spring 728.

Prior to energization of the coil 720, the locking ring 719 is stabilized in contact with the locking rubber 726 under the force of the locking spring 728.

When the locking ring 719 rotates, the armature 724 comes into contact with the attracting yoke 729 to compress the armature spring 723, thereby equalizing the positional relationship of the attracting yoke 729 and the armature 724 and thus stopping the rotation of the locking ring 719, as shown in FIG. 27B.

FIG. 28 is a timing chart of the locking ring drive operation.

At 719i in FIG. 28, the coil 720 is energized (PWM drive indicated by 720b) and the attracting coil magnet 730 is simultaneously energized (730a). Thus the armature 724 comes into contact with the attracting yoke 729, and, at the state of equalization, the armature 724 is attracted by the attracting yoke 729.

Then the coil 720 is deactivated at 720c in FIG. 28 whereupon the locking ring 719 tends to rotate clockwise by the force of the locking spring 728, but such rotation is restricted because the armature 724 is attracted by the attracting yoke 729 as mentioned above. In this state, the projection 75f of the support frame 75 opposes the cam portion 719f (by the rotation thereof), whereby the support frame 75 is rendered movable by an amount corresponding to a clearance between the projection 75f and the cam portion 719f.

Consequently the support frame 75 tends to drop in the direction of gravity (cf. FIG. 27B), but such drop is prevented because movement of the support frame 75 is also controlled at 719i in FIG. 28.

The support frame 75 in the uncontrolled state is restricted inside the internal periphery of the locking ring 719, but in fact has a play corresponding to the fitting play between the projection 75f and the internal peripheral wall 719g. Consequently the support frame 75 tends to drop in the direction of gravity by the amount of such play so that the center of the support frame 75 is displaced from that of the base plate 71. For this reason, there is executed a control of slow movement to the center of the base plate 71, for example, within a one second period from 719i (see FIG. 28).

Such slow movement is adopted because an unpleasant image vibration is perceived by the photographer in the case of a rapid movement to the center, and also in order to avoid deterioration of the image resulting from movement of the support frame 75 during an exposure operation executed in the course of such movement. Such slow movement is executed, for example, by moving the support frame 75 by 5 pm within ⅛ seconds.

More specifically, the outputs of the position detectors 78p, 78y at 719i in FIG. 28 are stored in memory, then the control of the support frame 75 is initiated with such output values as the target values, and the support frame 75 is moved within a one second period to the predetermined target values at the optical center (see 75g in FIG. 28).

After the locking ring 719 is rotated to the unlocked state, the support frame 75 is driven based on the target values from the vibration detection means (in superposition with the above-mentioned movement of the support frame 75 to the central position), whereby a vibration prevention operation is initiated.

When the vibration prevention operation is turned off at 719j, the target values from the vibration detection means are no longer entered into the correction drive means for driving the correction means, whereby the support frame 75 is controlled and stopped at the central position. In this state, the attracting coil 730 is deactivated (730b), whereby the attracting yoke 729 loses the attracting force to the armature 724 and the locking ring 719 rotates clockwise under the force of the locking spring 728 and returns to the state shown in FIG. 27A. In this state, the locking ring 719 impinges on the locking rubber 726, thus being restricted in rotation, whereby the noise of collision of the locking ring 719 at the end of rotation can be suppressed.

Thereafter (for example after 20 msec), the control of the correcting drive means is terminated, whereby the control shown in FIG. 28 is terminated.

FIG. 29 is a block diagram showing a circuit configuration relating to the image blur correcting function, in a camera provided with the above-explained image vibration correcting device.

The output of vibration detection means 2 is amplified by amplifier means 3, and is entered into an A/D conversion port of a microcomputer. Also the output of position detection means 4, for detecting the position of the correction lens, is amplified by amplifier means 5 and entered into the A/D conversion port of the microcomputer 1. The microcomputer 1 processes these two signals and outputs correction lens driving data to correction lens drive means 6, thereby driving the correction lens and correcting the image blur. Lock-unlock drive means 7 executes the drive for the aforementioned locking coil, to maintain the device in the unlocked state.

In the following there will be explained an example of the functions of the microcomputer 1 relating to the image blur correcting device, with reference to a flow chart shown in FIG. 30.

The correction of image blur is executed by an interrupt process, for example, at a predetermined timing interval. The aforementioned lock-unlock control is executed in a main flow of the camera.

In response to an interrupt signal, the microcomputer 1 starts the sequence from a step #81:

[step #81] executes A/D conversion of the output of the vibration detection means 2 composed, for example, of an angular velocity sensor;

[step #82] discriminates whether an image blur correction start command has been received, and, if not, the sequence proceeds to a step #83.

Steps #83 and #84 are operations without the image blur correction:

[step #83] initializes the DC offset and the integration calculation, as the image blur correction is not executed;

[step #84] clears a timer for measuring the time after reception of the image blur correction start command.

If the foregoing step #82 identifies that the image blur correction start command has been received, the sequence proceeds to a step #85:

[step #85] discriminates whether a predetermined time has elapsed since the reception of the image blur correction start command, and, if not, the sequence proceeds to a step #86.

Steps #86 and #87 are operations within a predetermined time after the reception of the image blur correction start command, during which the image blur correcting operation is not yet executed:

[step #86] calculates the DC offset, in order that the initial input to the high-pass filter does not show an abrupt change (or a stepped input) by the DC component;

[step #87] initializes the high-pass filter calculation, thereby bringing the result of integration to 0, in order to electrically retain the correction lens at the center.

If step #85 identifies the lapse of the predetermined time after the reception of the image blur correction starting command, the image blur correcting operation is initiated from a step #88:

[step #88] cuts off the components under a predetermined frequency (cut-off frequency determined by capacitor and resistor) from the A/D converted output of the angular velocity sensor, in order to initiate the image blur correction, and executes a high-pass filter calculation for passing the signal components of actual vibration;

[step #89] executes a known integration for calculating the angular displacement data;

[step #90] executes an adjustment for the variation in the amount of eccentricity (sensitivity) of the correction lens relative to the vibration angle, depending on the zoom or focus position;

[step #91] stores the result of the abovementioned calculation (drive data for image blur correction) in a RAM area set by SFTDRV in the microcomputer 1;

[step #92] discriminates whether the correction system driving data SFTDRV is within the electrically movable range (stroke limit position) DRVLMT, and, if within that range, the sequence proceeds to a step #94; if not within the range, the sequence proceeds to a step #93;

[step #93] writes, as the correction system driving data SFTDRV exceeds the stroke limit position DRVLMT, the value of the stroke limit position DRVLMT as the correction system driving data SFTDRV;

[step #94] executes A/D conversion on the output of the position detection means 4, detecting the position of the correction lens, and stores the obtained result in an area SFTPST of the RAM;

[step #95] executes a feedback calculation (SFTDRV-SFTPST);

[step #96] multiplies the result of the feedback calculation with the loop gain;

[step #97] executes a phase compensation calculation for realizing a stable control system;

[step #98] outputs the result of the phase compensation calculation by a PWM signal to the port of the microcomputer 1, whereupon the interrupt process is terminated.

The above-mentioned output is supplied to the correction lens driving means 6, thereby driving the correction lens and correcting the image blur.

In this manner image blur correction is conducted by the above-explained configuration.

In a camera equipped with the above-explained image blur correcting device, the actual photograph taking operation is conducted not only for a still object but also by following a moving object or by changing the aimed object, and the panning operation is frequently employed in such photograph taking operation.

Also the photographer may intentionally produce a vibration larger than hand vibration, in order to confirm, on the view finder, that the image blur correction function is properly functioning.

In such a panning operation, a signal of a large amplitude is entered into the angular velocity sensor, and, if the image blur correction is executed according to such signal, the correction lens collides with the mechanical stroke end (end of mechanically movable range) eventually resulting in generation of noise or damage in the correction lens. In order to prevent such situation, there has been adopted a countermeasure such as varying the characteristics of integration for a vibration of a large amplitude or setting an electrical stroke limit position as explained in the foregoing steps #92 and #93.

However, in case a large vibration is intentionally given in the direction of gravity, the correction lens cannot stop at the electrical stroke limit position because of the weight of the correction lens and the inertial force thereof but may collide with the mechanical stroke end beyond the electrical stroke end, thus leading to noise generation and damage of the correction lens. Such possibility increases particularly in a case where the correction lens becomes heavier, with correspondingly increased gravity and inertial force.

In order to prevent such situation, it is conceivable to select a smaller electrical stroke limit position. However, since the electrical stroke limit position is the same in the vertical (gravitational) direction and in the horizontal (perpendicular) direction, such selection leads to a general contraction of the stroke range. Though the range of correction can theoretically be selected larger in the horizontal direction because the possibility of going beyond the limit position and colliding with the mechanical stroke end is low due to the absence of a gravitational force, it has not been possible to select an effective stroke for the above-mentioned reason.

Also the precision of the image blur correction can be improved by optimizing the control according to the various situations, such as photographing of a still object, photographing of a moving object and photographing with the camera installed on a tripod.

For this reason, it has already been proposed to provide plural image blur correction modes and to effect optimum control of image blur correction according to the selected mode, thereby improving the precision of the image blur correction.

In such system, there should be an optimum range enabling the image blur correction in each mode, but such difference has not been considered and the image blur correcting range has been selected to be the same in all the modes.

Also, in a camera equipped with the above-explained image blur correcting device, there exists image blur correcting characteristics for matching each of various situations, such as photographing of a still object, photographing of a moving object and photographing with the camera installed on a tripod, and it is important to suitably select such characteristics.

For example, in the case of photographing a still object, there can be selected such image blur correcting characteristics as to correct even vibration of a low frequency, but, in the case of photographing a moving object, the image blur correction with such characteristics will respond also to a panning operation, so that the operability of the camera will be deteriorated. In such case, therefore, the characteristics covering the low-frequency range should be eliminated.

For this reason, it has already been proposed to provide plural image blur correction modes and to effect optimum control of the image blur correction operation according to the mode selected by an external operation, thereby enabling optimum photographing operation under any photographing situation.

However, if the image blur correction mode is switched in the course of the image blur correcting operation, the characteristics change totally so that the result of calculation of the vibration detection shows a discontinuous change. As the image blur correction is executed according to such calculations, an abrupt change will occur in the image in the view finder, resulting in an unpleasant feeling for the photographer.

SUMMARY OF THE INVENTION

One aspect of the present invention is to provide an image blur preventing device comprising a movable lens movable in a first direction and in a second direction different from the first direction for image blur prevention, a driving device for driving the movable portion according to a vibration signal varying in response to the detection output of a vibration sensor for detecting the vibration state of the device, and a limiting portion for limiting the movable range of the movable portion to a predetermined range by limiting the drive of the driving device in response to the vibration signal thereby achieving limitation of the movable range in such a manner as to set a first range in the first direction and to set a second range, different from the first range, in the second direction, thereby enabling image blur prevention in all directions.

Another aspect of the present invention is to provide an image blur preventing device comprising a movable lens movable for image blur prevention, a filter portion for cutting off predetermined frequency components from the detection output of a vibration sensor for detecting the vibration state of an apparatus, with a variable cut-off frequency, a driving device for driving the movable portion according to a signal corresponding to the output of the filter portion, a limiting portion for limiting the operation range of the movable portion to a predetermined range by limiting the drive of the driving device in response to the vibration signal thereby achieving limitation of the operation range, and a variable portion for varying the operation range in response to the change in the cut-off frequency in the filter portion, thereby enabling image blur prevention matching every situation of use.

Still another aspect of the present invention is to provide an image blur preventing device comprising a movable lens movable for image blur prevention, an integrating portion for integrating the detection output of a vibration sensor for detecting the vibration state of an apparatus, with variable integration characteristics, a driving device for driving the movable portion according to a signal corresponding to the output of the integrating portion, a limiting portion for limiting the operation range of the movable portion to a predetermined range by limiting the drive of the driving device in response to the vibration signal thereby achieving limitation of the operation range, and a variable portion for varying the operation range in response to the change in the integrating characteristics of the integrating portion, thereby enabling image blur prevention matching every situation of use.

BRIEF DESCRIPTION OF THE DRAWINGS

FIG. 28 is a wave form chart showing signals when the locking ring shown in FIGS. 27A and 27B is driven;

DETAILED DESCRIPTION OF THE PREFERRED EMBODIMENTS

Now the present invention will be described in detail with reference to specific embodiments thereof, with reference to the attached drawings.

First Embodiment

Figure 1:
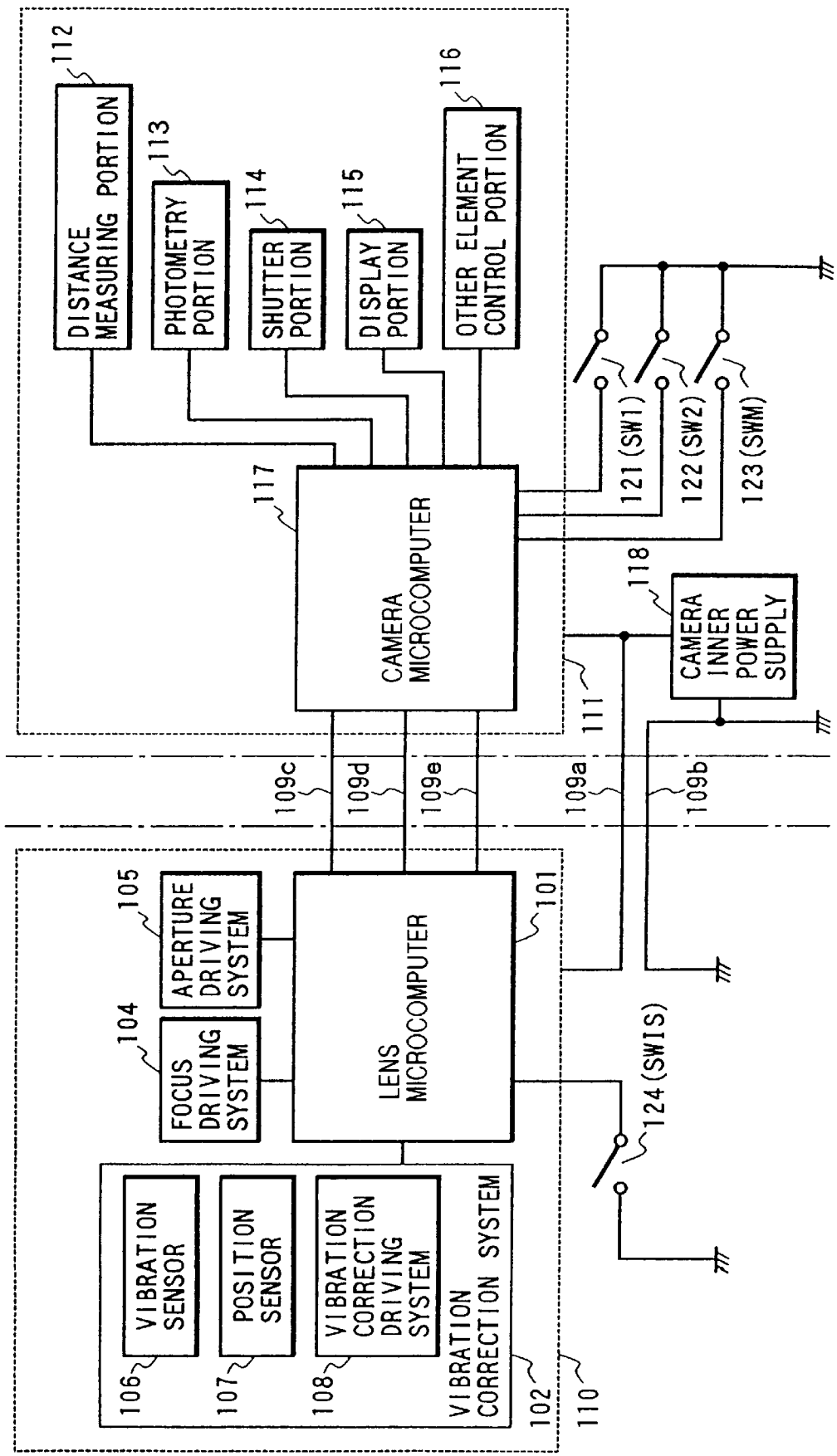
FIG. 1 is a block diagram showing the circuit configuration of a single lens reflex camera and an interchangeable lens constituting a first embodiment of the present invention.

FIG. 1 is a block diagram of an embodiment of the present invention, wherein the image blur correcting function is applied to an interchangeable lens of a single lens reflex camera.

Figure 19:
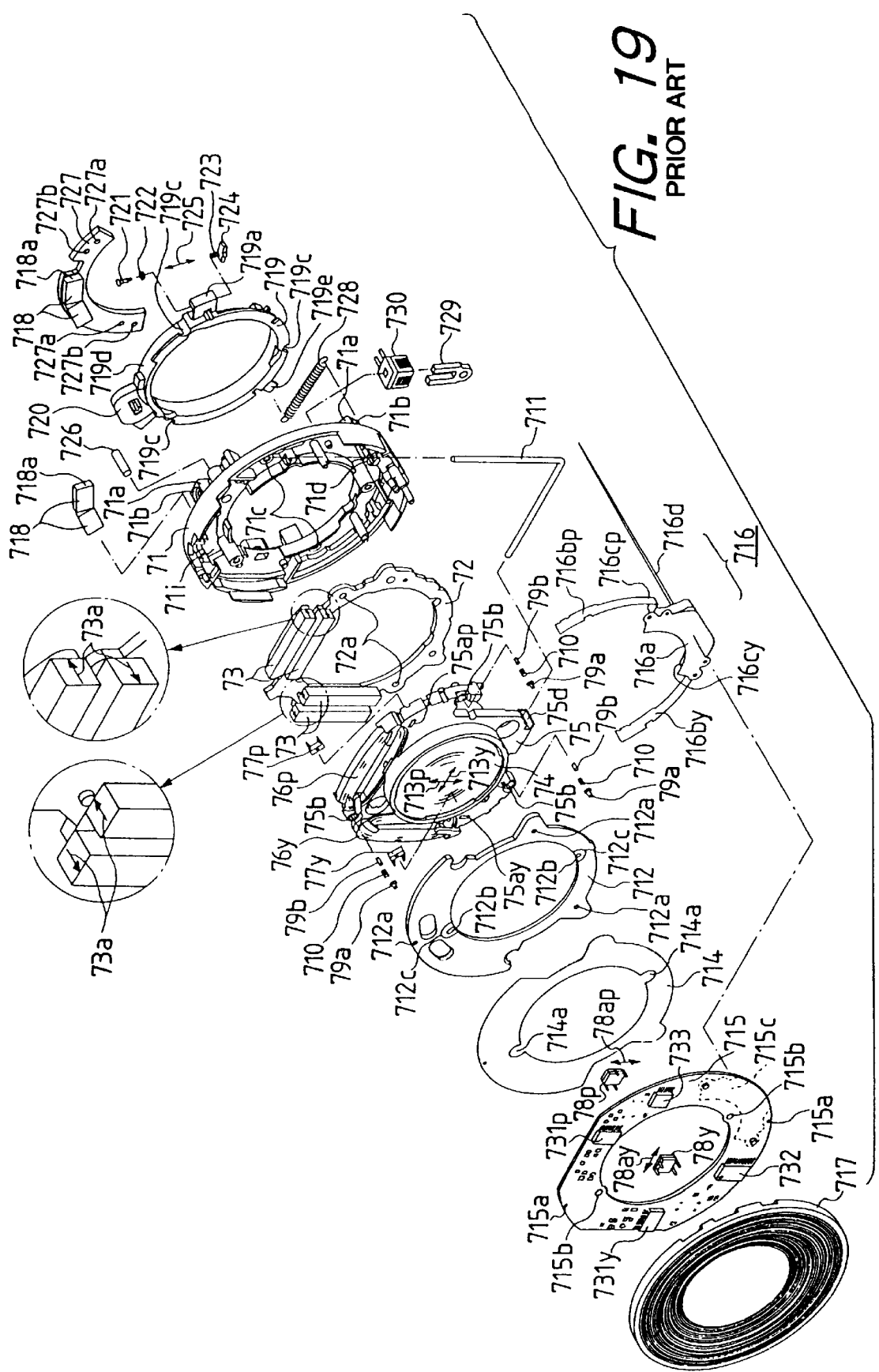
FIG. 19 is an exploded perspective view showing the structure of the vibration correcting device shown in FIG. 18.
Figure 20:
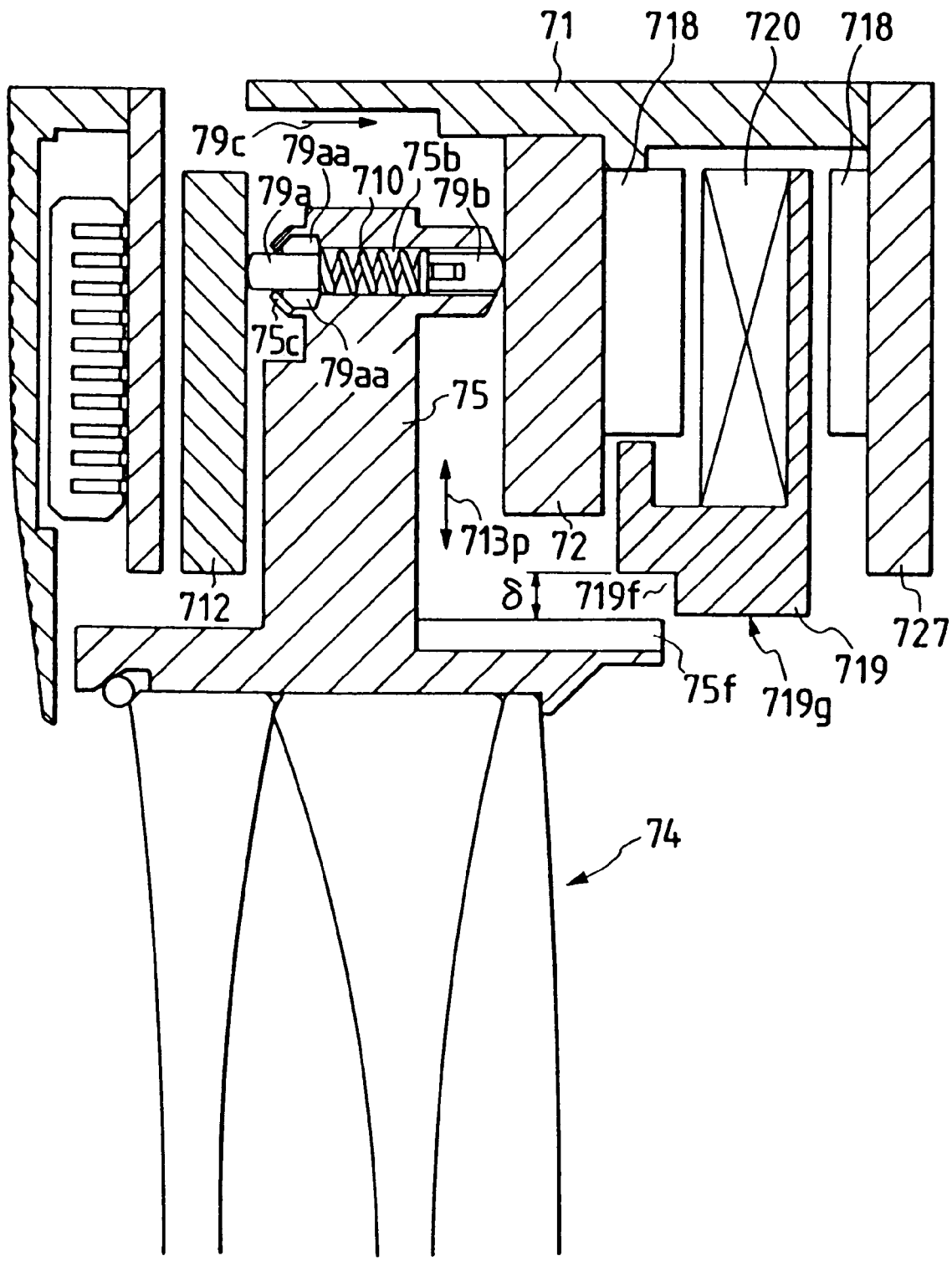
FIG. 20 is a view showing the shape of a hole of the support frame, in which support means shown in FIG. 19 is to be inserted.
Figure 21A:
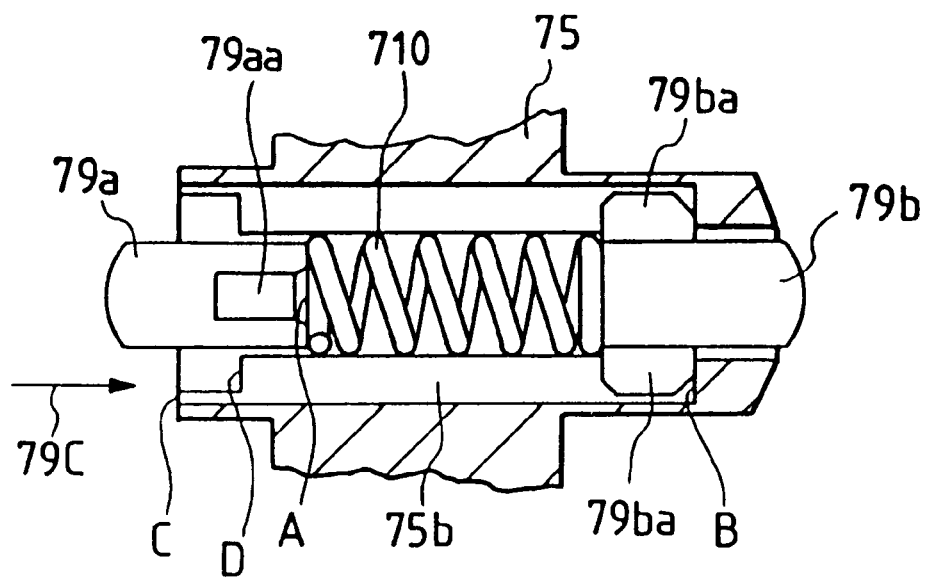
FIG. 21A is a cross-sectional view showing the state of assembly of a support frame into a base plate shown in FIG. 19.
Figure 21B:
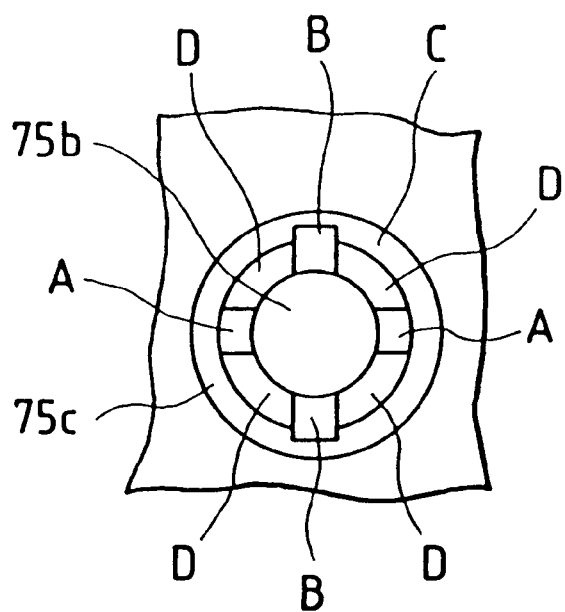
FIG. 21B is a view of the configuration shown in FIG. 21A, seen from a direction 79c therein.
Figure 22:
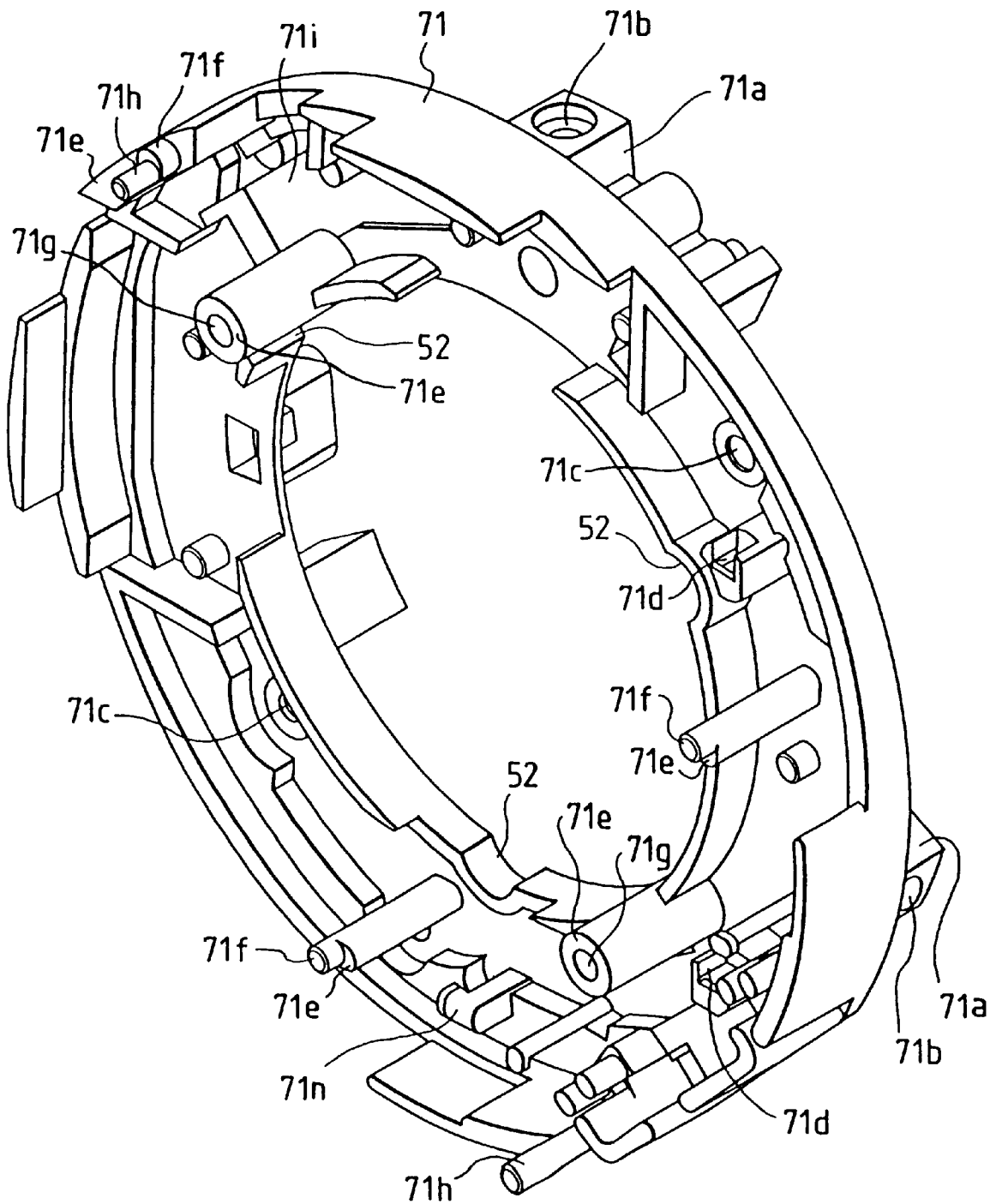
FIG. 22 is a perspective view of the base plate shown in FIG. 19.
Figure 23:
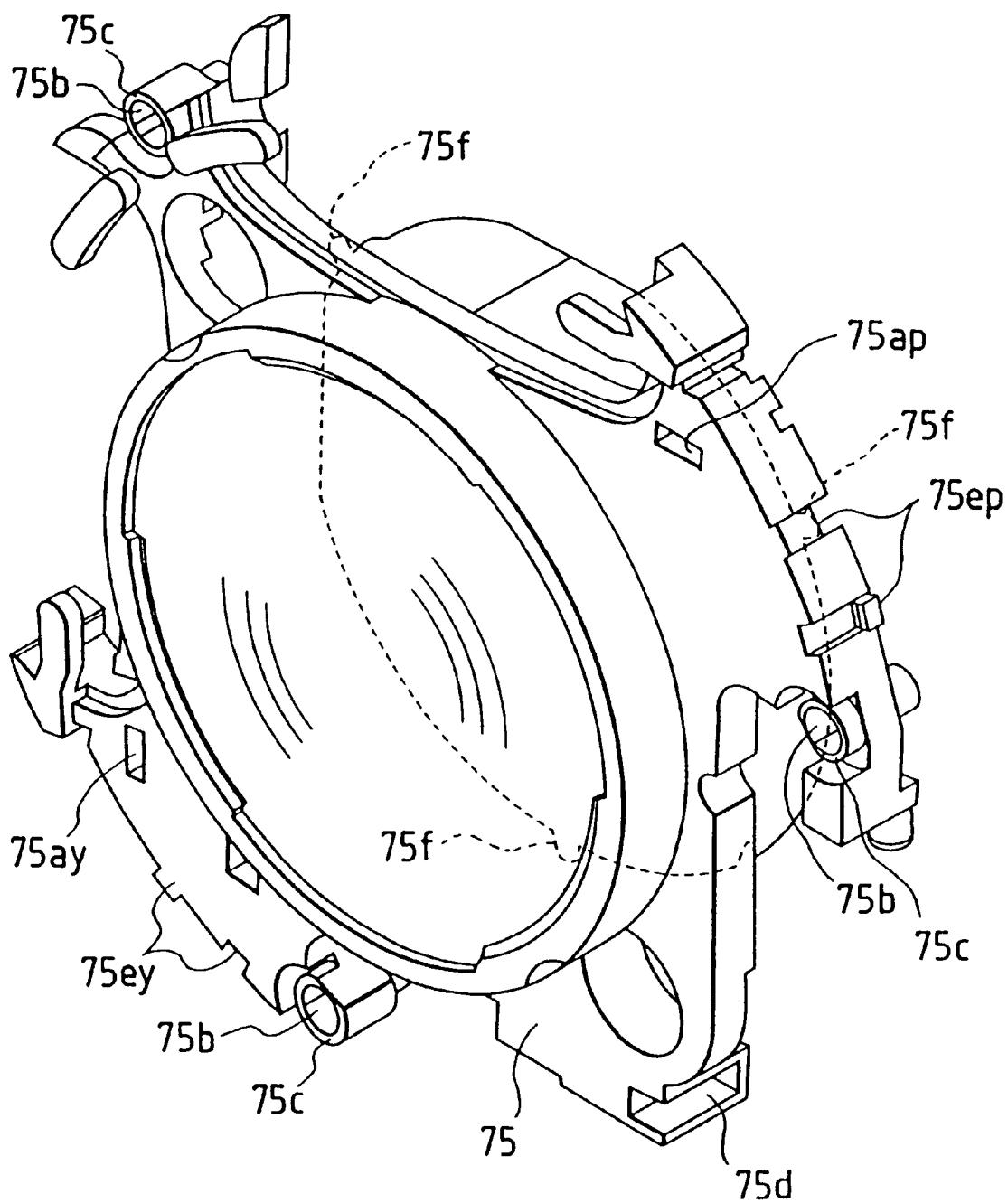
FIG. 23 is a perspective view of the support frame shown in FIG. 19.
Figure 24:
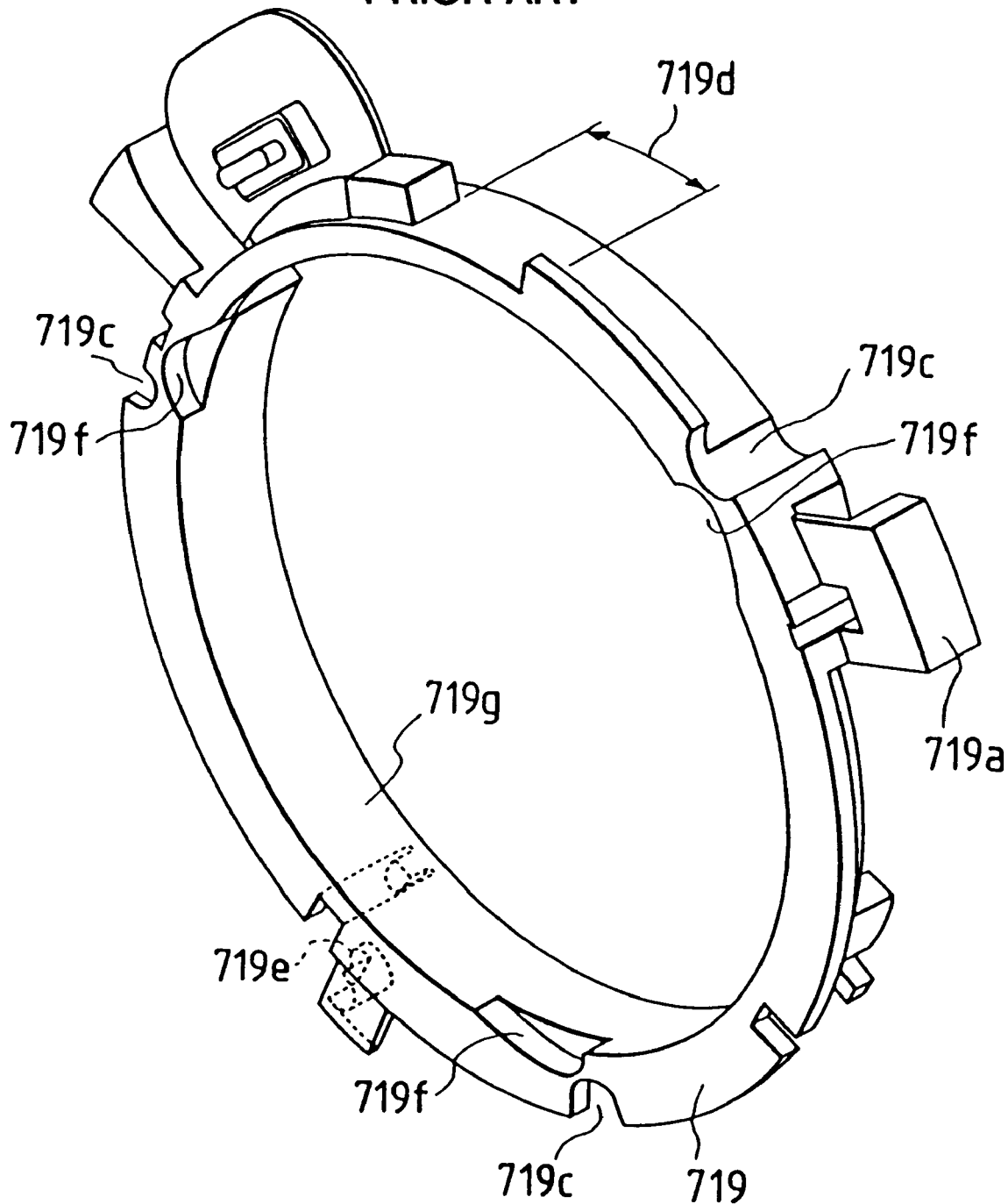
FIG. 24 is a perspective view of a locking ring shown in FIG. 19.
Figure 25:
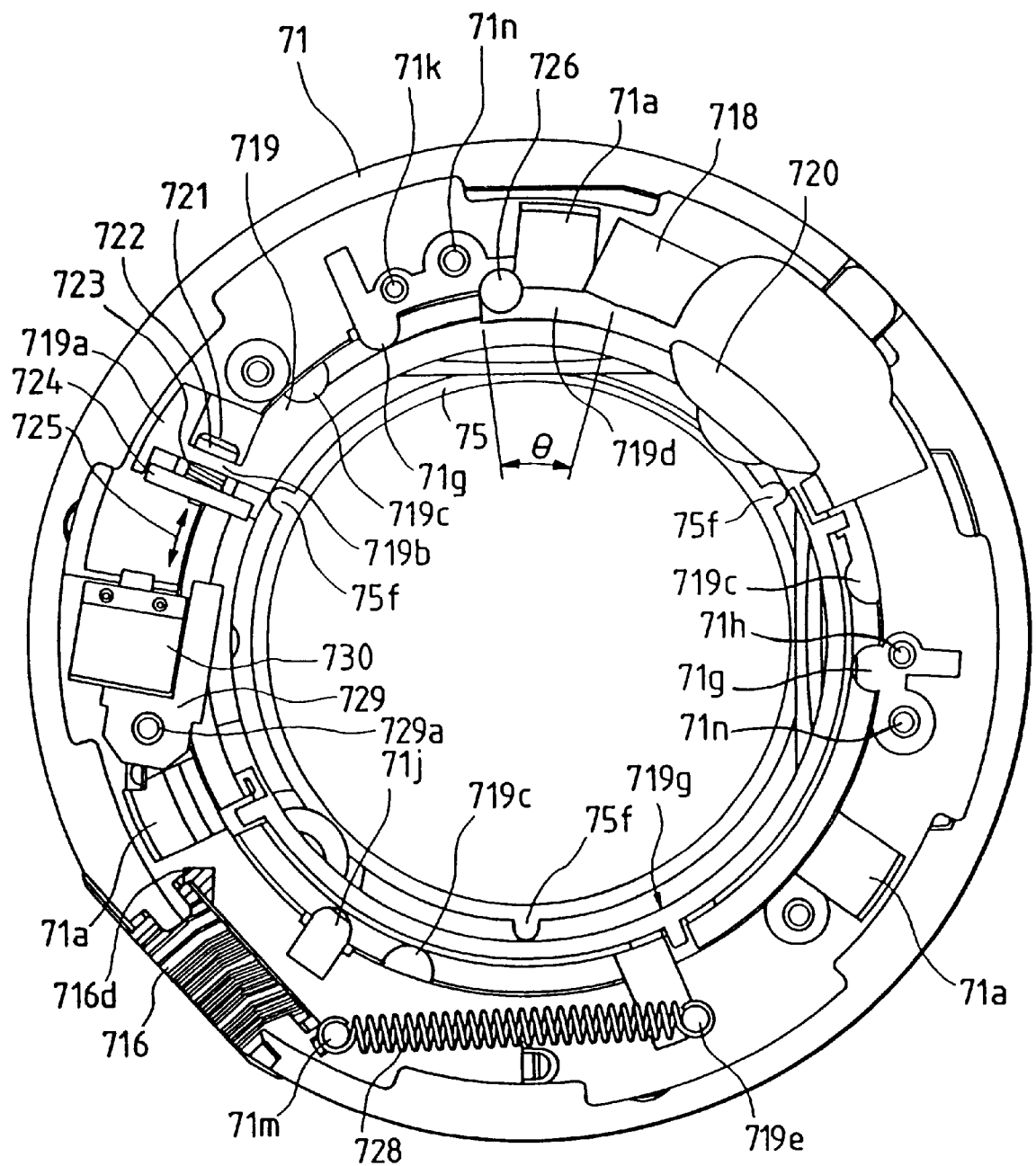
FIG. 25 is an elevation view of the support frame etc. shown in FIG. 19.
Figure 26:
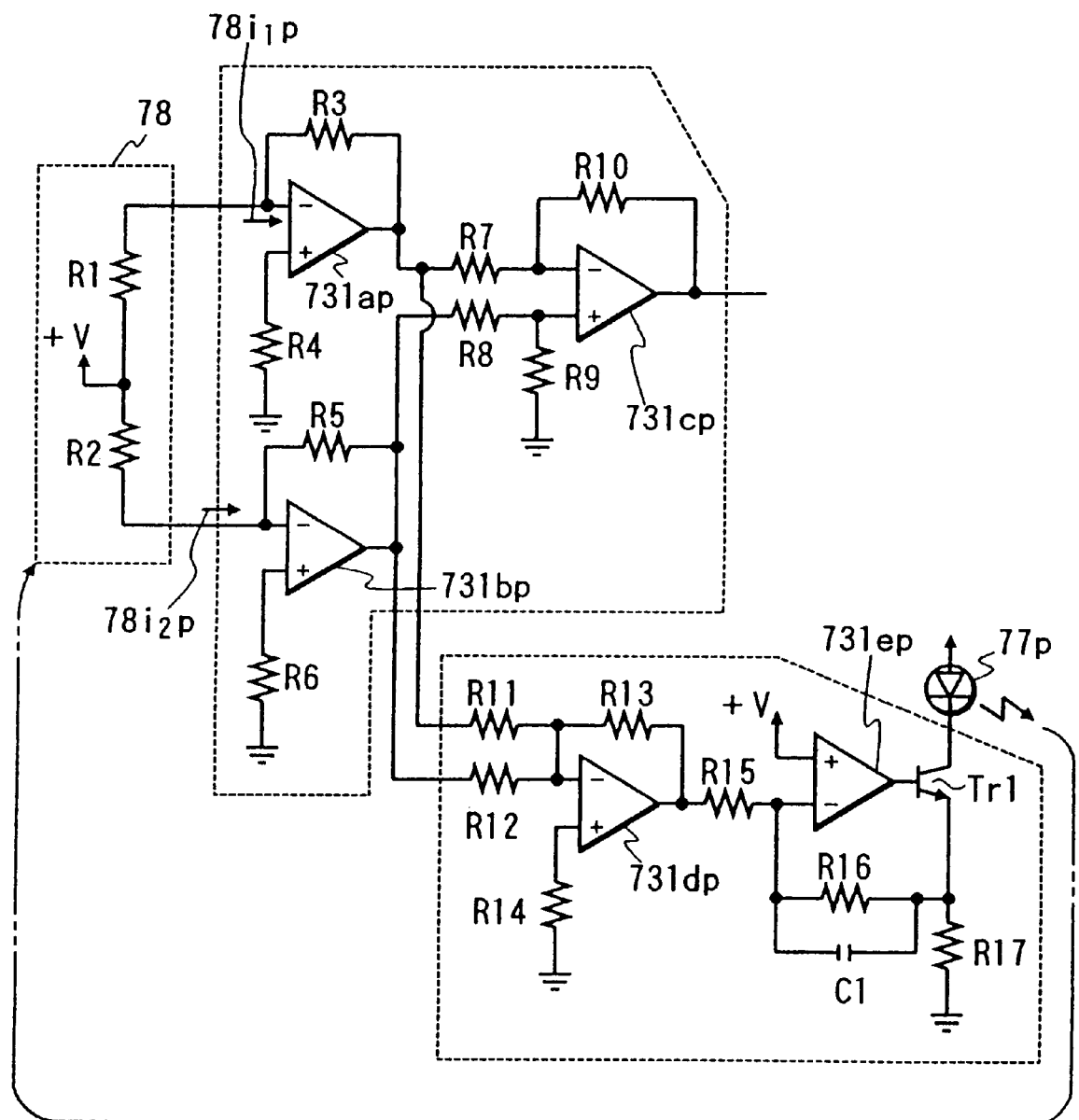
FIG. 26 is a circuit diagram showing the structure of an IC for amplifying the output of a position detector shown in FIG. 19.

Referring to FIG. 1, a lens microcomputer 101 receives communication from the main body of the camera through communication lines 109c (for clock signals) and 109d (for transmitting lens signals from the main body of the camera), and drives, according to the instructions by such signals, a vibration correction system 102, a focus driving system 104 and an aperture driving system 105, as shown in FIG. 19, and also controls the vibration correction system 102.

The vibration correction system 102 is composed of a vibration sensor 106 for detecting vibration, such as an angular movement sensor, a position sensor 107 for detecting the position of a correction lens, and a vibration correction driving system 108 for effecting image blur correction by driving the correction lens according to a drive signal calculated by the lens microcomputer 101, based on the outputs of the vibration sensor 106 and the position sensor 107.

An image blur correction starting switch (SWIS) 124 for executing the image blur correcting operation is turned on when the image blur correcting operation is selected.

The focus driving system 104 executes a focusing operation by driving a focusing lens in accordance with an instruction from the lens microcomputer 101. The aperture driving system 105 executes an operation of returning the aperture to a predetermined aperture value according to an instruction from the lens microcomputer 101.

The lens microcomputer 101 also executes transmission of lens status information (zoom position, focus position, diaphragm aperture value, etc.) and information on the lens (fully-open aperture value, focal length, data required for distance measurement, etc.) to the main body of the camera, through a communication line 109e (for signal transmission from the lens to the main body of the camera).

A lens electrical system 110 is constituted by the lens microcomputer 101, the vibration correction system 102, the focus driving system 104 and the aperture driving system 105. Electric power is supplied to the lens electrical system 110 from the camera inner power supply 118, through a communication line 109a and a ground line 109b.

In the main body of the camera, there is provided an electrical system 111 including a distance measuring portion 112, a photometry portion 113, a shutter portion 114, a display portion 115, an other element control portion 116 and a camera microcomputer 117 for starting and stopping the functions of these portions and executing exposure calculation, distance calculation, etc. Electric power also is supplied to the electrical system 111 from the camera inner power supply 118.

A switch 121 (SW1) for initiating the photometry and the distance measurement and a shutter releasing switch 122 (SW2) for initiating a shutter releasing operation constitute 2-stroke switches, in which the switch SW1 is turned on by a first stroke depression of a shutter release button and the switch SW2 is turned on by a second stroke depression.

A switch 123 (SWM) is provided for selecting the exposure modes. The change in the exposure mode may be made by turning switch 123 (SWM) on and off or by simultaneously operating switch 123 (SWM) and another operation member.

In the following there will be explained the function in the interchangeable lens of the camera of the above-explained configuration.

Figure 2:
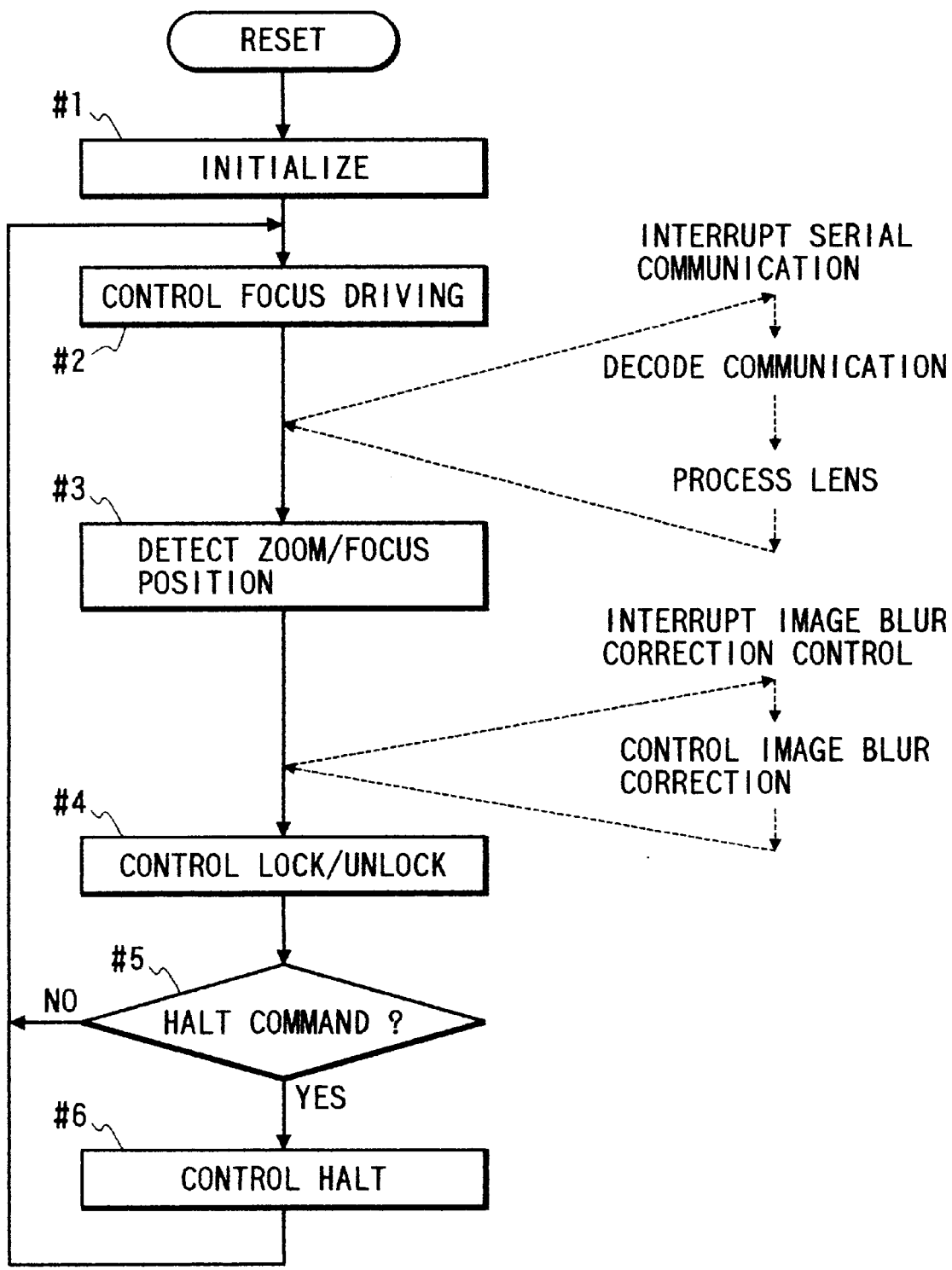
FIG. 2 is a flow chart showing the main operation flow of a lens microcomputer shown in FIG. 1.

The lens microcomputer 101 executes the aforementioned lens control according to a flow chart shown in FIG. 2. In the following the functions will be explained with reference to FIG. 2.

In response to any operation such as the closing of the switch SW1 of the camera, a communication is made from the camera main body (hereinafter simply referred to as the camera) to the interchangeable lens (hereinafter simply referred to as the lens) whereby the lens microcomputer 101 initiates the operation from a step #1:

[step #1] executes initialization for lens control and image blur correction control;

[step #2] executes a focus driving operation in response to a command from the camera;

[step #3] detects the zoom position and the focus position;

[step #4] executes lock-unlock control of the support frame (correction lens) constituting the correcting optical means as explained before in relation to FIG. 28, according to a communication from the camera or the state of the switch SWIS;

[step #5] determines whether a HALT command (for stopping all the actuators in the lens) has been received from the camera, and, if not received, the sequence is repeated from the step #2.

If step #5 determines that the HALT command has been received, the sequence proceeds to step #6:

[step #6] executes HALT control, in which all the drives are suspended and the lens microcomputer 101 enters a sleep state.

If an interrupt signal for serial communication or for image blur correcting control is requested by a communication from the camera in the course of the above-mentioned operations, these functions are executed as an interrupt process.

The interrupt process for a serial communication executes decoding of communication data, and a lens process such as aperture drive. Decoding of the communication data identifies a closing command for the switch SW1 or SW2, the shutter time, the kind of the camera, etc.

Figure 3:
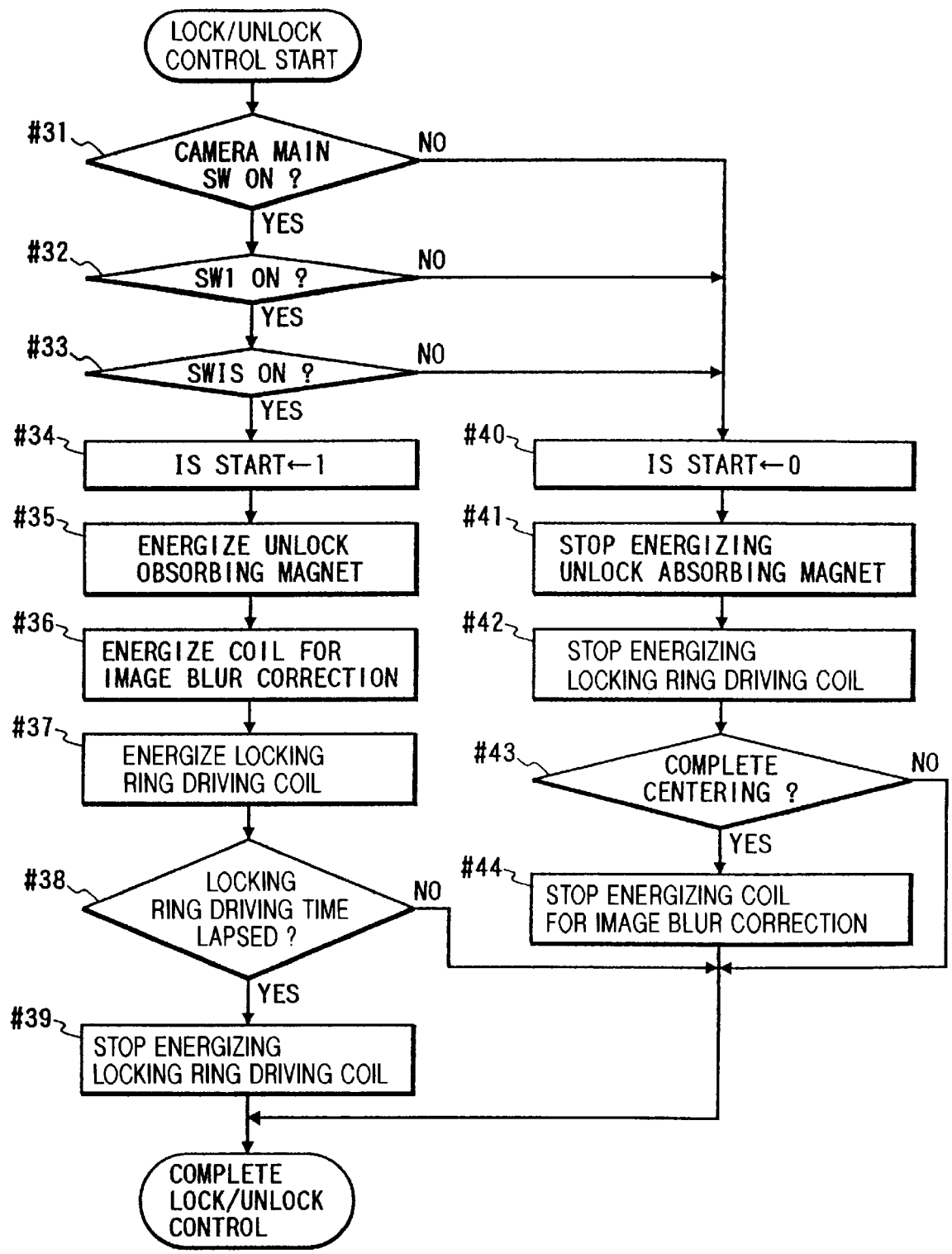
FIG. 3 is a flow chart showing a lock-unlock control to be executed by the lens microcomputer shown in FIG. 1.

In the following there will be explained locking control, or a lock-unlock operation, executed in the above-mentioned step #4, with reference to a flow chart shown in FIG. 3. The image blur correcting device of the present embodiment is assumed to have the structure shown in FIG. 19. Also the image blur correcting operation is assumed to be started when the main switch of the camera, and the switches SW1 and SW2 are all turned on:

[step #31] determines whether the main switch of the camera is turned on, and, if on, the sequence proceeds to a step #32;

[step #32] determines whether the switch SW1 of the camera has been turned on, and, if on, the sequence proceeds to a step #33;

[step #33] determines whether the switch SWIS has been turned on, and, if on, the sequence proceeds to a step #34.

Figure 27A:
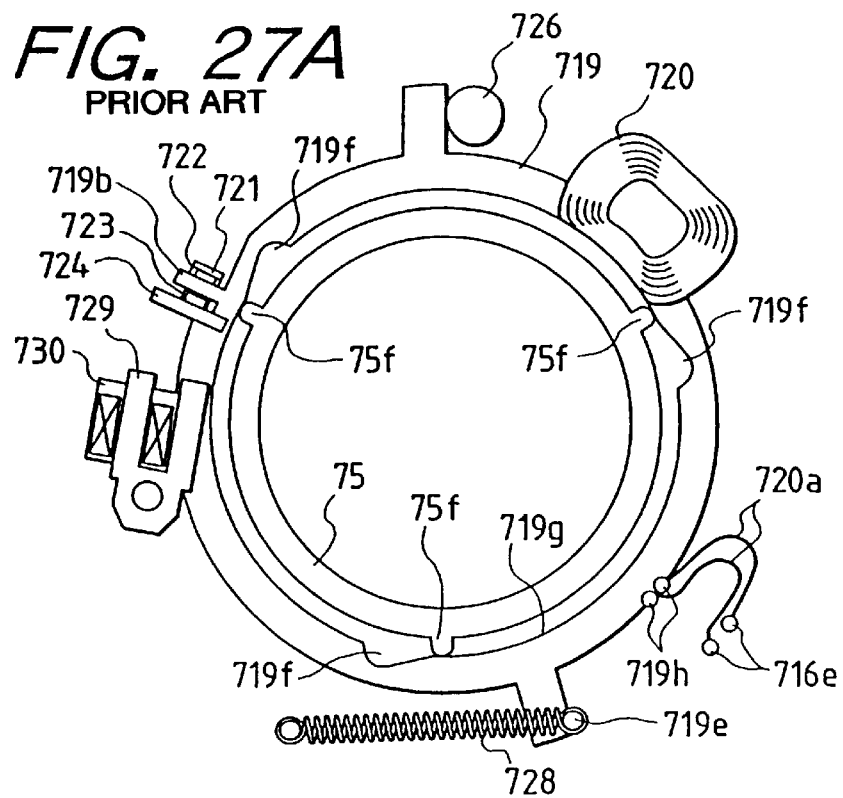
FIGS. 27A and 27B are views showing the state when the locking ring shown in FIG. 19 is driven.
Figure 27B:
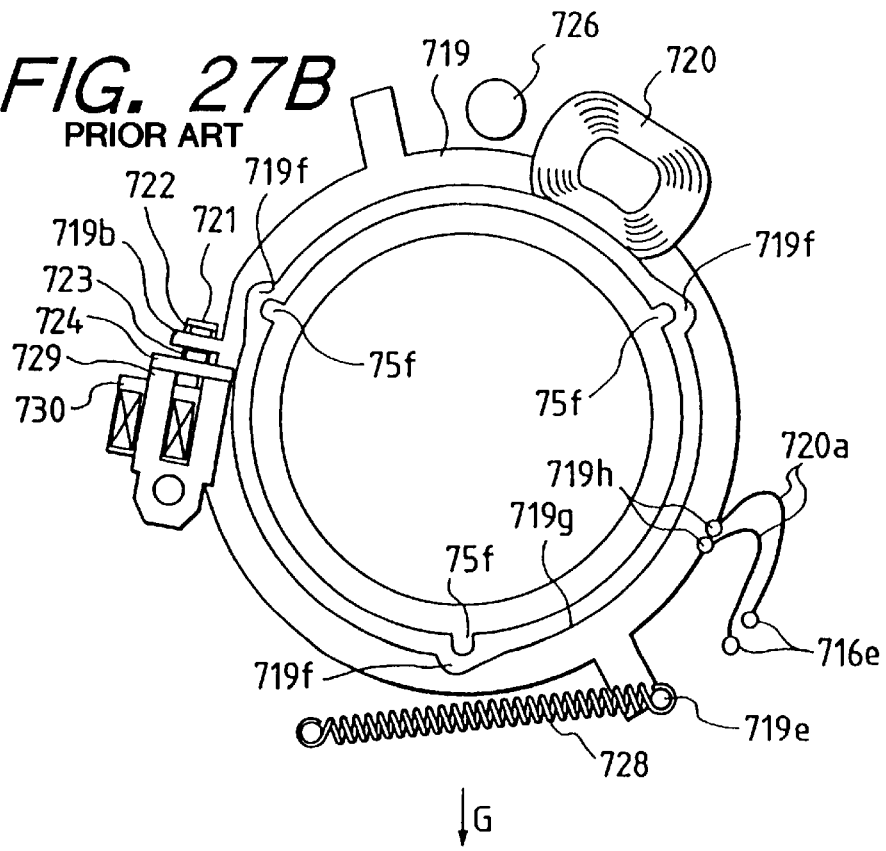
Figure 29:
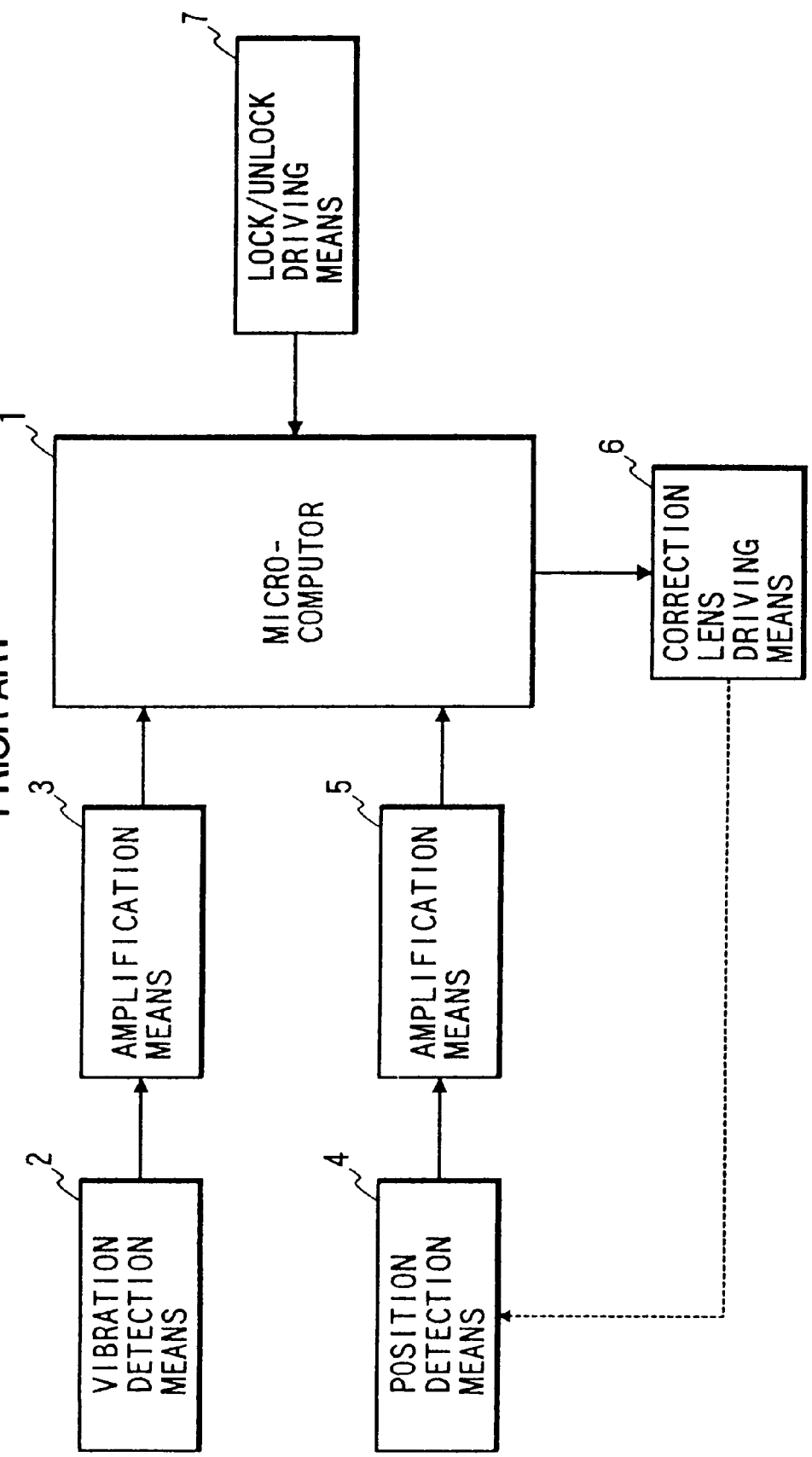
FIG. 29 is a block diagram showing the circuit configuration of the image blur correcting system of an ordinary camera equipped with the image blur correcting device.
Figure 30:
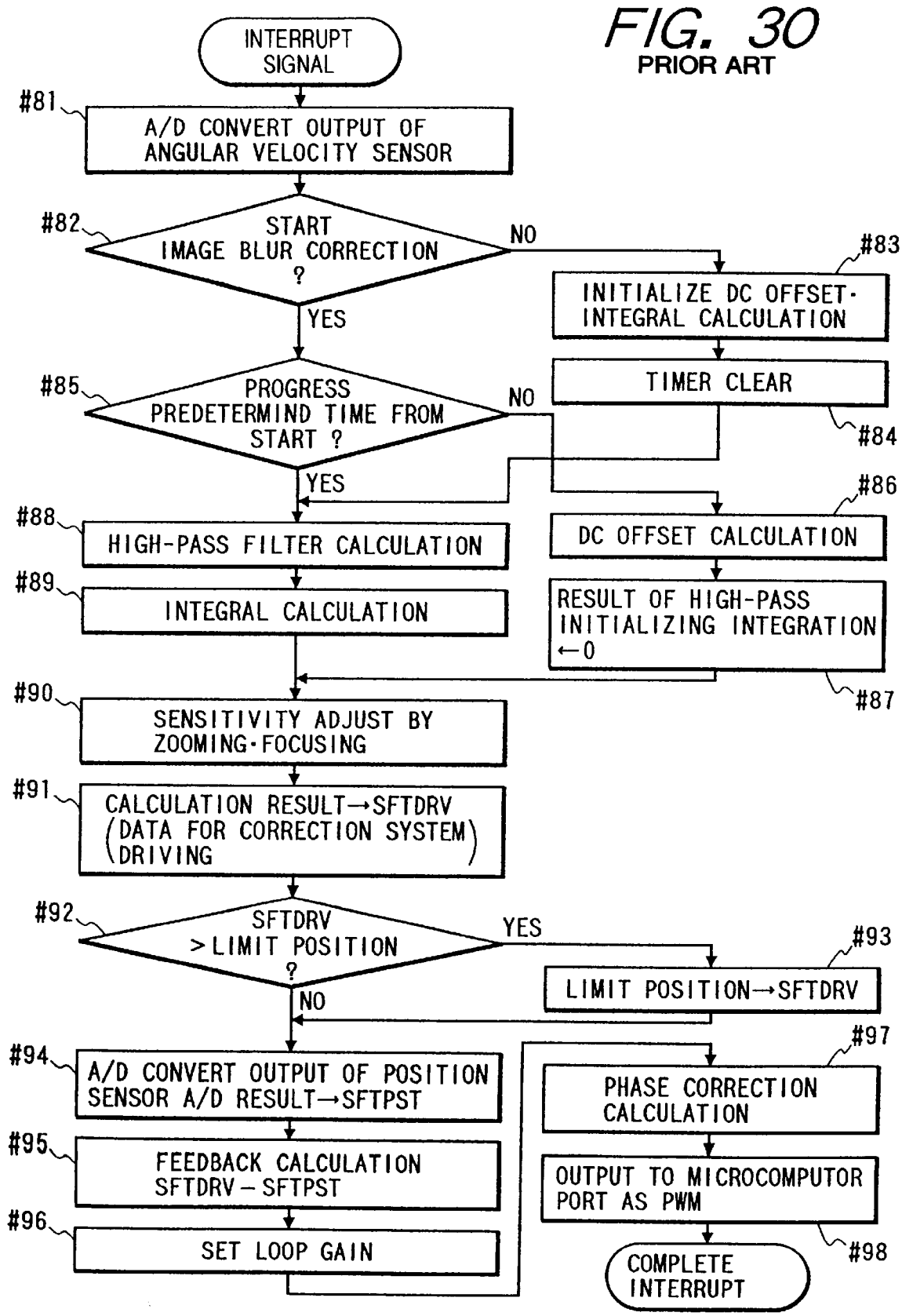
FIG. 30 is a flow chart showing a conventional image blur correcting operation.

Thus, the image blur correcting operation is started from step #34 if the main switch of the camera and the switches SW1, SW2 are all turned on. If any of these switches is off, an image blur correction terminating operation is executed in step #40, as will be explained later:

[step #34] sets an image blur correction start flag IS_START;

[step #35] energizes the unlocking attraction magnet, in order to retain the rotated state (unlocked state) of the locking ring against the force of the locking spring, as explained before in relation to FIG. 27B;

[step #36] energizes the vibration correcting drive coil;

[step #37] energizes the locking ring drive coil, thereby rotating the locking ring;

[step #38] determines whether a locking ring drive time has elapsed. The locking ring drive time is selected so that the unlocked state can be retained by the unlocking attraction magnet, even when the rotation of the locking ring is terminated in following step #39. If the locking ring drive time has not elapsed, this subroutine is terminated and same operations are repeated until the locking ring drive time elapses. When the lapse of the locking ring drive time is identified thereafter, the sequence proceeds to a step #39:

[step #39] terminates energization of the locking ring drive coil, thereby to attain the unlocked state.

On the other hand, if any of the main switch and switches SW1, SW2 of the camera is off, there is executed, as explained before, an image blur correction terminating operation from a step #40:

[step #40] clears the image blur correction start flag IS_START;

[step #41] stops energizing of the unlock absorbing magnet, whereby the locking ring rotates in the locking direction due to the force of the locking spring, thereby realizing a locked state;

[step #42] stops energizing of the locking ring drive coil, since it may be turned off in the course of drive the locking ring;

[step #43] determines whether a centering operation, for shifting the correction lens to the center position of the movable range, has been completed, and, if not, the subroutine is terminated and the same operations are repeated until the centering operation is completed. When completion of the centering operation is subsequently determined, the sequence proceeds to step #39:

[step #44] stops energizing of the image blur correcting coil, since the correction lens is at the center of the movable range.

The lock-unlock operation is conducted in the above-explained manner.

Figure 4:
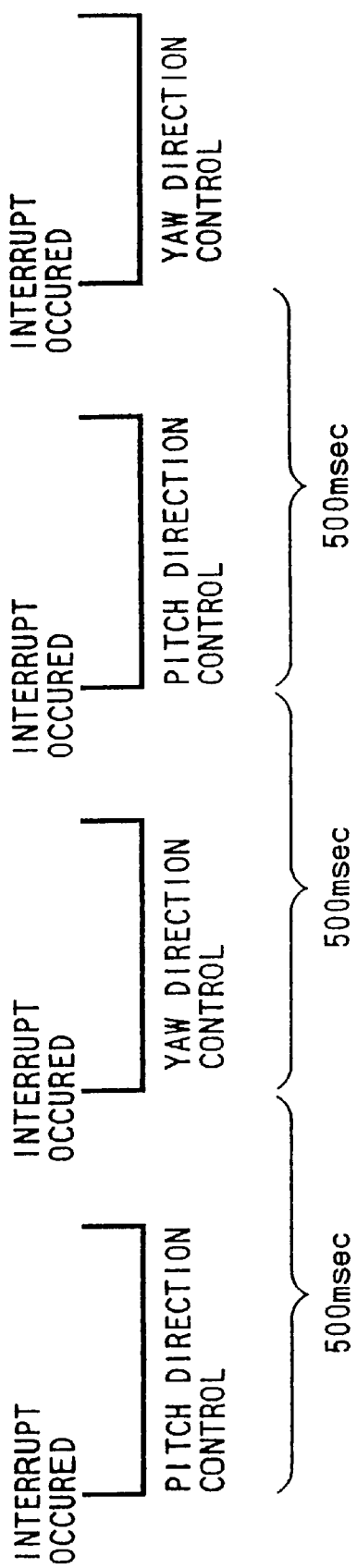
FIG. 4 is a timing chart showing an interrupt operation for image blur correction, to be executed by the lens microcomputer shown in FIG. 1.

The image blur correcting interrupt operation is a timer interrupt, generated at a constant interval (for example 500 msec), as shown in FIG. 4. Since control in the vertical (pitching) direction and control in the horizontal (yawing) direction are executed alternately, as shown in FIG. 4, the sampling interval for either direction is 1 msec. Though the control method (calculation coefficients, etc.) is same for both directions, the results of the calculations are naturally different for the pitching and yawing directions. Consequently, a reference address is selected for each of the pitching and yawing directions, and data such as the results of calculations are designated by indirect addresses in RAM, and the reference address is switched between control in the pitching direction and control in the yawing direction.

Figure 5:
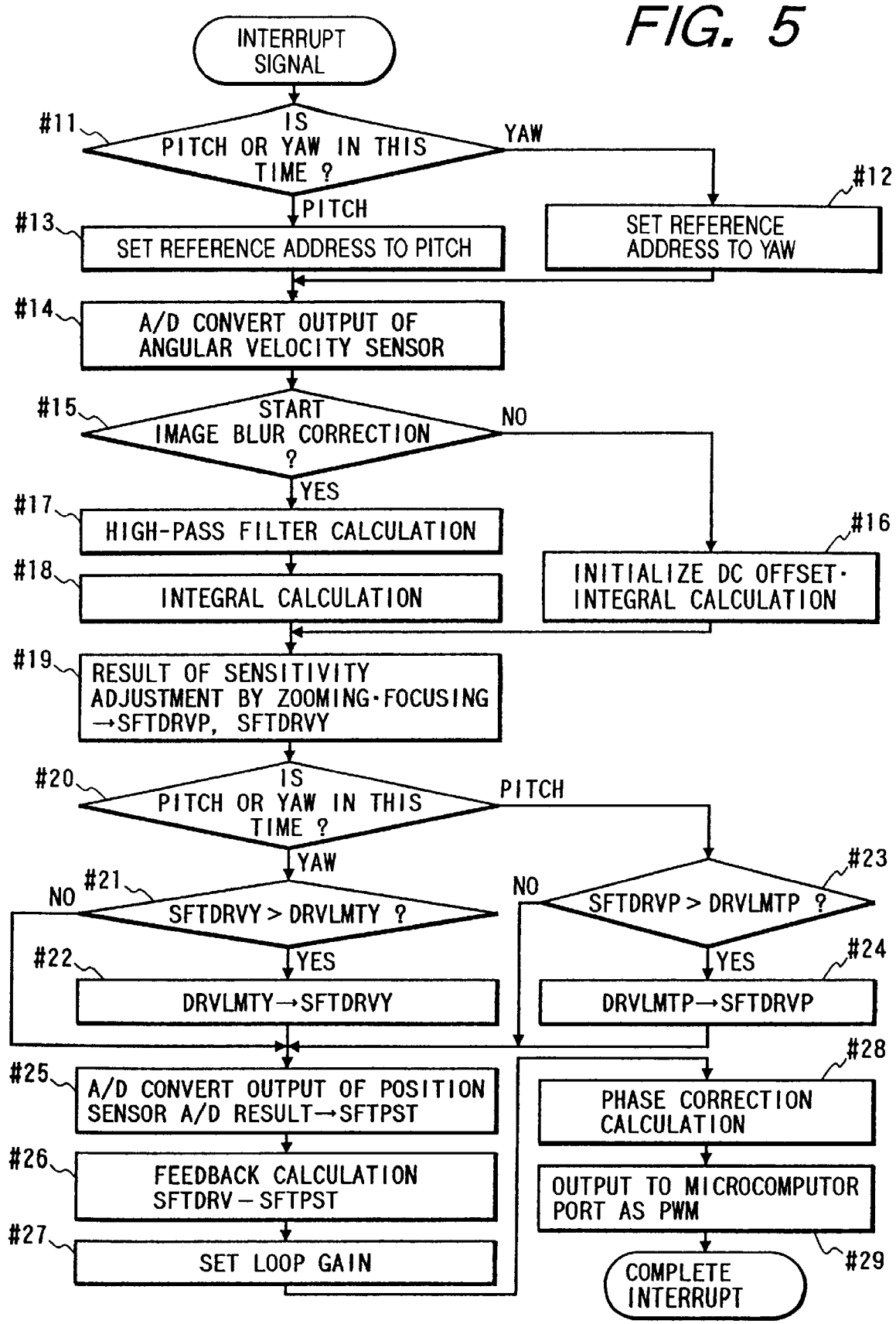
FIG. 5 is a flow chart of the interrupt operation for image blur correction, to be executed by the lens microcomputer shown in FIG. 1.

When an image blur correcting interrupt is generated in the course of a main operation of the camera, the lens microcomputer 101 starts image blur correcting control at step #11, as shown in FIG. 5:

[step #11] determines whether the current control is in the pitching or yawing direction, and, if in the yawing direction, the sequence proceeds to step #12;

[step #12] sets the reference address of the aforementioned portion designated by the indirect addresses, for the yawing direction control, and the sequence proceeds to step #14.

If the current control is determined to be in the pitching direction, the sequence proceeds to step #13:

[step #13] sets the reference address of the aforementioned portion designated by the indirect addresses, for pitching direction control;

[step #14] fetches the output of the angular velocity sensor, composed of the vibration sensor 106, and executes A/D conversion of the output;

[step #15] determines whether IS-START=1, namely whether image blur correction is to be started, and the sequence proceeds to step #16 if image blur correction is not to be executed;

[step #16] executes initialization of the high-pass filter and integration, as image blur correction is not to be executed, and the sequence proceeds to step #19.

On the other hand, if step #15 determines that image blur correction is to be executed, the sequence proceeds to step #17:

[step #17] executes a high-pass filter calculation, for image blur correction;

[step #181] executes integration to obtain angular displacement data;

[step #19] executes adjustment for the change in the amount of eccentricity (sensitivity) of the correction lens for the vibration angle, depending on the zoom and focus positions. This adjustment provides data SFTDRVY, SFTDRVP corresponding to the drive amounts of the correction lens;

[step #20] determines whether current control is in the pitching or yawing direction, and, if in the yawing direction, the sequence proceeds to a step #21;

[step #21] compares SFTDRVY with the stroke limit position DRVLMTY for yawing direction control, and the sequence proceeds to step #25 if SFTDRVY is within the limit position, but to step #22 if SFTDRVY exceeds the limit position;

[step #22] writes DRVLMTY into SFTDRVY.

If the foregoing step #20 determines that the current control is in the pitching direction, the sequence proceeds to a step #23:

[step #23] compares SFTDRVP with the stroke limit position DRVLMTP for the pitching direction control, and the sequence proceeds to step #25 if SFTDRVP is within the limit position, but to step #24 if SFTDRVP exceeds the limit position;

[step #24] writes DRVLMTP into SFTDRVP;

[step #25] executes A/D conversion on the output of the position sensor 107 for detecting the position of the correction lens, and stores the result of A/D conversion in a RAM area set by SFTPST in the microcomputer;

[step #26] executes a feedback calculation (SFTDRV−SFTPST);

[step #27] multiplies the result of the feedback calculation with the loop gain;

[step #28] executes a phase compensating calculation for realizing a stable control system;

[step #29] outputs the result of the phase compensating calculation as a PWM signal to the port of the microcomputer.

The above-mentioned output is supplied to the vibration correction driving system 108, whereby the correction lens is driven to achieve image blur correction.

The timer interrupt process is thus completed.

The stroke limit position is set separately in the pitching direction and in the yawing direction in the above-explained steps #21–#24. Thus, when the camera is held in the normal (horizontal) position, the pitching direction is the direction of gravity, and, even if the stroke limit position is selected small in the pitching direction in order to avoid collision of the correction lens with the mechanical stroke end, the correcting range can be made larger in the yawing direction without the gravitational force by selecting a condition DRVLMTY>DRVLMTP, whereby the correcting stroke can be effectively utilized.

The stroke limit position in the pitching direction is selected smaller than that in the yawing direction as explained above, because the camera is generally used more often in the normal orientation; however, since the camera also may be used in the vertical orientation, it is also possible to always reduce the stroke limit position in the direction of gravity by determining the direction of gravity, for example, with a known inclination switch, and then reducing the stroke limit position in the pitching direction or in the yawing direction, respectively, based on whether the camera is in the normal orientation or in the vertical orientation.

A second embodiment is provided with plural image blur correction modes.

Figure 6:
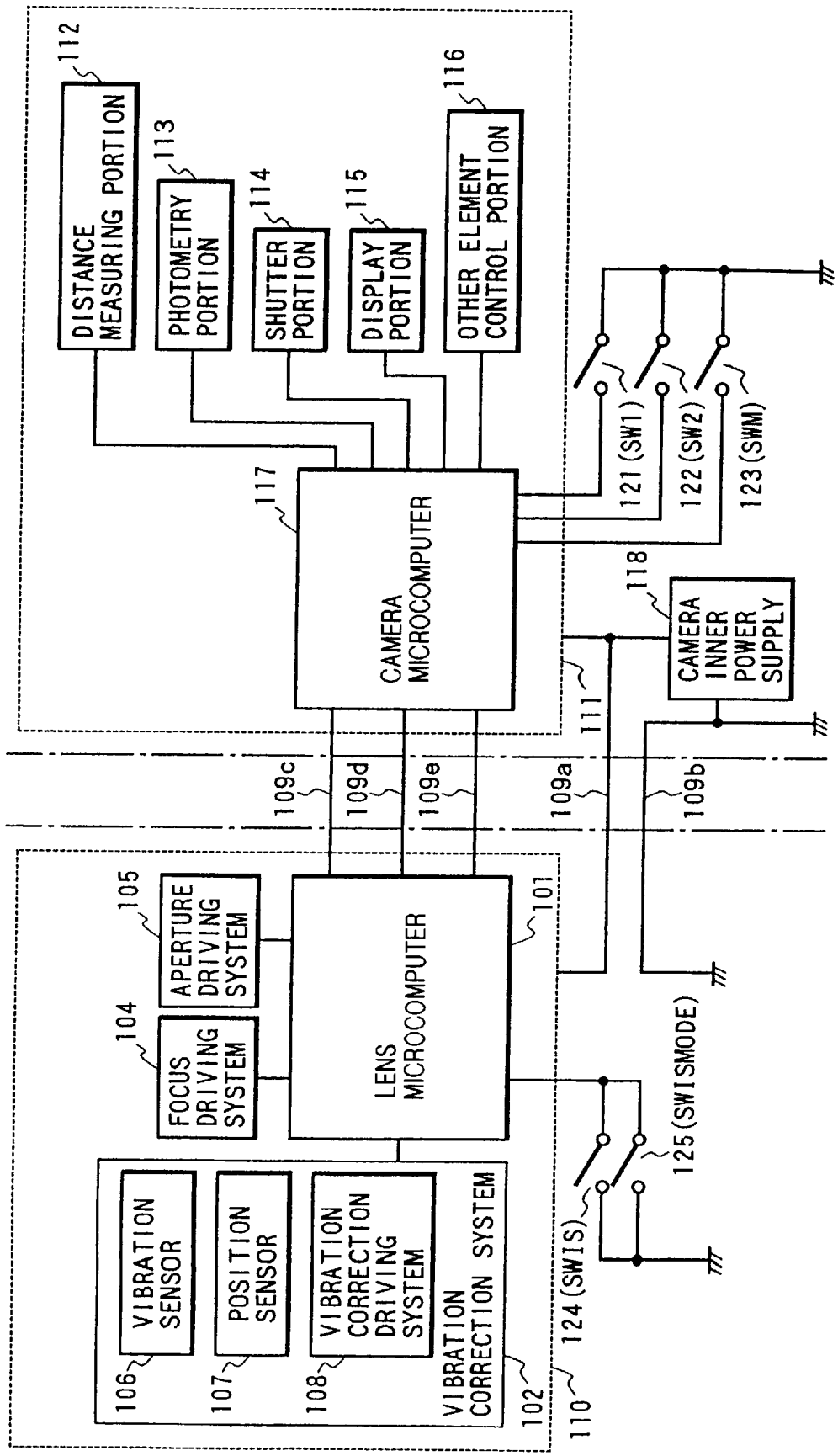
FIG. 6 is a block diagram showing the circuit configuration of a single lens reflex camera and an interchangeable lens constituting a second embodiment of the present invention.

The circuit configuration is shown in FIG. 6, and is the same as that shown in FIG. 1 except that a switch 124 (SWISMODE) is provided for switching between plural image blur correcting modes.

Figure 7:
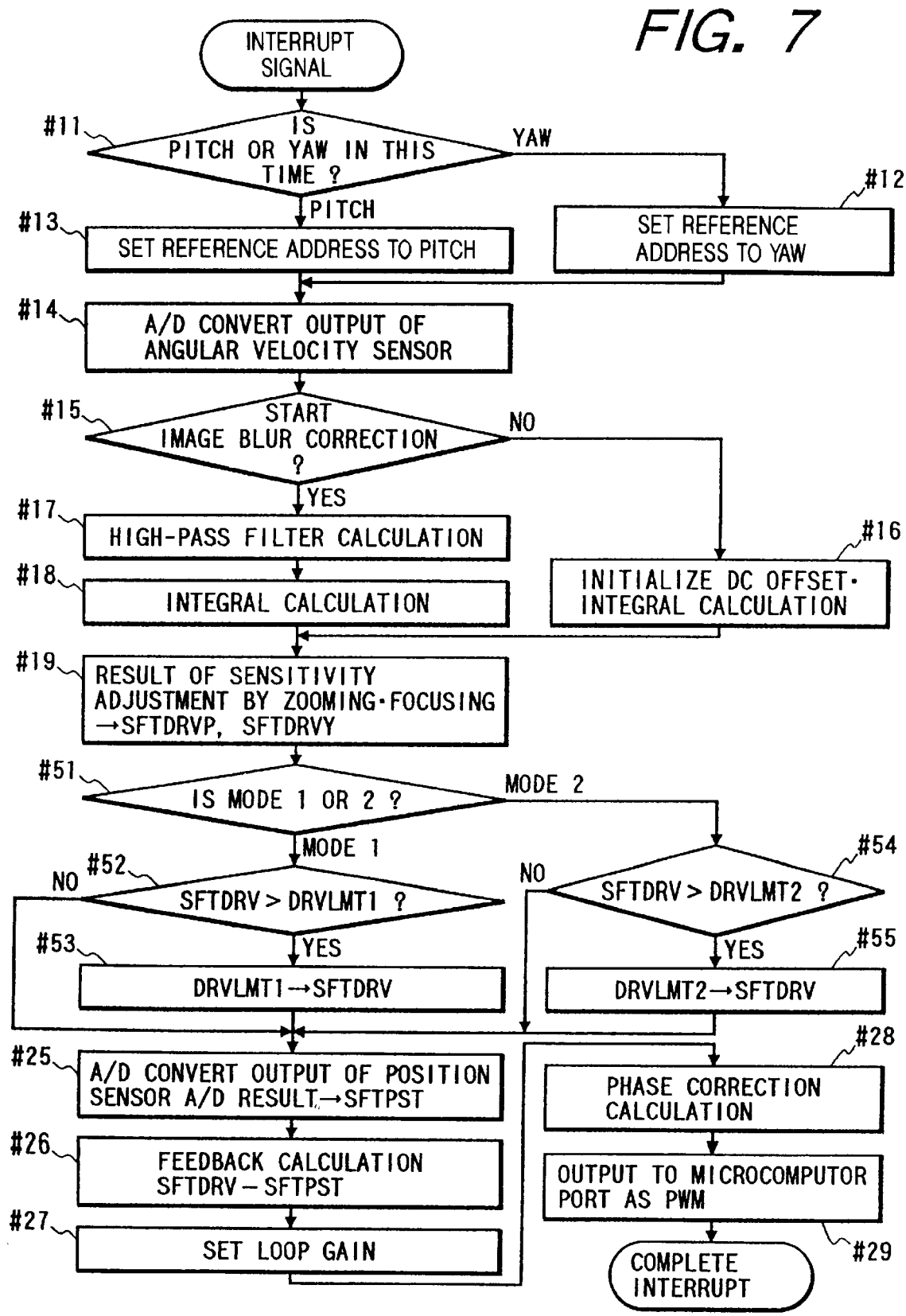
FIG. 7 is a flow chart showing an image blur correcting interrupt operation, to be executed by the lens microcomputer in the interchangeable lens, in the second embodiment of the present invention.

In the following there will be explained, with reference to a flow chart shown in FIG. 7, the functions of the present second embodiment. In the following description, a description of parts similar to those in the foregoing first embodiment shown in FIG. 5 will be omitted and only steps #51 to #55, which are specific to the present second embodiment, will be explained:

[step #51] determines a mode 1 or 2 according to the state of the image blur correcting mode selection switch SWISMODE, and the sequence proceeds to a step #52 or #54, respectively, in the case of mode 1 or 2.

Since image blur correcting characteristics can be modified according to various photographing conditions, one of plural modes is selected by the photographer by switching the switch 124 according to the photographing condition to obtain satisfactory result of photographing. In the present embodiment, mode 1 provides characteristics suitable for photographing a still object, more specifically characteristics with a lower cut-off frequency (for example 0.1 Hz) of the high-pass filter or the integration, while mode 2 provides characteristics suitable for photographing a moving object, more specifically characteristics with a higher cut-off frequency (for example 0.3 Hz) of the high-pass filter or the integration:

[step #52], being in mode 1, compares SFTDRV with the stroke limit position DRVLMT1, and the sequence proceeds to step #53 or #25, respectively, based on whether the stroke limit position DRVLMT1 is exceeded or not;

[step #53] writes DRVLMT1 into SFTDRV.

Also if step #51 determines mode 2, the sequence proceeds to step #54;

[step #54], being in mode 2, compares SFTDRV with the stroke limit position DRVLMT2, and the sequence proceeds to step #55 or #26, respectively, based on whether the stroke limit position DRVLMT2 is exceeded or not;

[step #55] writes DRVLMT2 into SFTDRV.

In the following there will be explained the relationship between the stroke limit positions DRVLMT1 and DRVLMT2.

As explained in the foregoing, mode 2 is suitable for photographing a moving object, and it is important, for improving the result of photography, to reduce the feeling of reversed vibration, which is specific in the image blur correction in the panning operation. As the absolute amount of such reversed vibration can be reduced by reducing the stroke limit position, the stroke limit position DRVLMT2 in mode 2 is selected smaller than DRVLMT1 in mode 1, to achieve image blur correction in a more appropriate manner.

The operations starting from a step #56 are similar to those in the foregoing first embodiment and will not, therefore, be explained.

As explained in the foregoing, the stroke limit position is switched in steps #51–#55 for each mode, so that the stroke limit position can be selected in an optimum manner under any photographing condition.

In the present embodiment, mode 1 is selected for taking the image of a still object while mode 2 is selected for taking the image of a moving object, but there may be provided other modes such as a mode for photographing on a tripod and a mode for photographing while the photographer is walking, in addition to or in place of the above-mentioned modes. For example, in the photographing mode while walking, the stroke limit position may be increased because the vibration is large.

In the present second embodiment, the stroke limit positions in the pitching and yawing directions in a same mode may be made mutually different as in the first embodiment.

Also, the stroke limit position DRVLMT1 in mode I for taking the image of the still object may be selected so as to prevent collision with the mechanical stroke end or may be eliminated. In the latter case, steps #52 and #53 are deleted and the correcting range is expanded to the mechanical stroke end. It is also possible, in a same mode, for example, to set an electrical stroke limit position for the pitching direction but not to set such electrical stroke limit position for the yawing direction, thereby expanding the correcting range to the mechanical stroke end.

Third Embodiment

A third embodiment provides a case of varying the stroke limit position according to the lens position of the other axis (in practice lens drive data corresponding to the lens position).

The circuit configuration will not be explained further as it is the same as that in the foregoing first embodiment.

Figure 8:
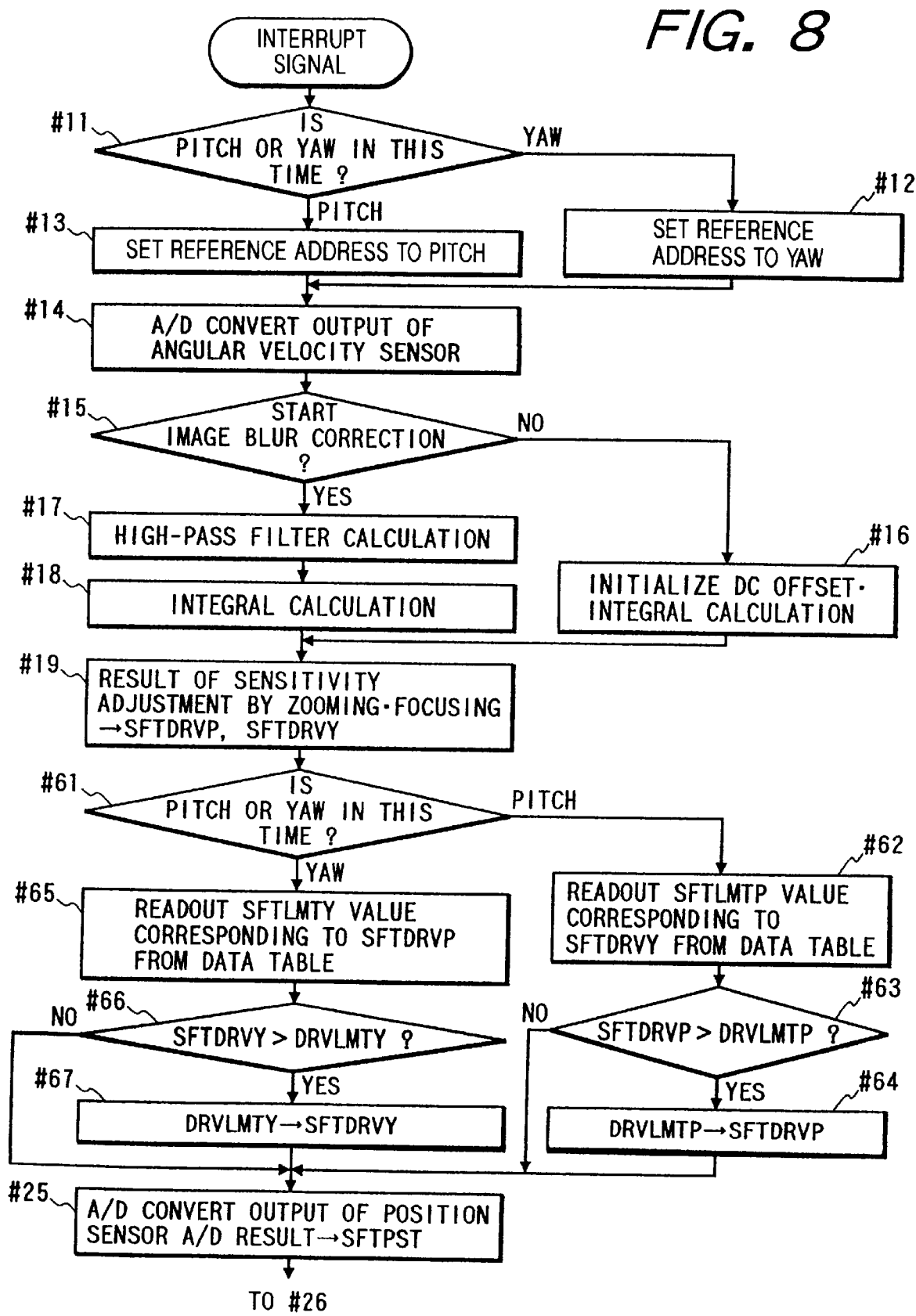
FIG. 8 is a flow chart showing an image blur correcting interrupt operation, to be executed by the lens microcomputer in the interchangeable lens, in a third embodiment of the present invention.

In the following there will be explained, with reference to a flow chart shown in FIG. 8, the functions of the present third embodiment. In the following description, description of parts similar to those in the foregoing first embodiment shown in FIG. 5 will be omitted and only parts specific to the present third embodiment will be explained. Also omitted is a part after the step #25, as it is similar to that shown in FIG. 5 or 7:

[step #61] determines whether the current control is for the pitching or yawing direction, and, if in the pitching direction, the sequence proceeds to step #62;

[step #62] reads the image blur correction drive data SFTDRVY for the yawing direction, and reads, from a data table, the stroke limit position DRVLMTP for the pitching direction, corresponding to the value of SFTDRVY. The DRVLMTP becomes smaller as SFTDRVY becomes larger;

[step #63] compares SFTDRVP with DRVLMTP and the sequence proceeds to step #25 or #64, respectively, based on whether the latter or the former is larger;

[step #64] writes DRVLMTP into SFTDRVP.

If step #61 determines that the current control is for the yawing direction, then sequence proceeds to step #65:

[step #65] reads the image blur correction drive data SFTDRVP for the pitching direction, and reads, from the data table, the stroke limit position DRVLMTY for the yawing direction, corresponding to the value of SFTDRVP. The DRVLMTY becomes smaller as SFTDRVP becomes larger;

[step #66] compares SFTDRVY with DRVLMTY and the sequence proceeds to step #25 or #67, respectively, based on whether the latter or the former is larger;

[step #67] writes DRVLMTY into SFTDRVY.

The ensuing operations will not be explained as they are similar to those in the foregoing first embodiment.

In the following there will be explained, with reference to FIG. 9, details of the operations in steps #62 and #65.

Figure 9:
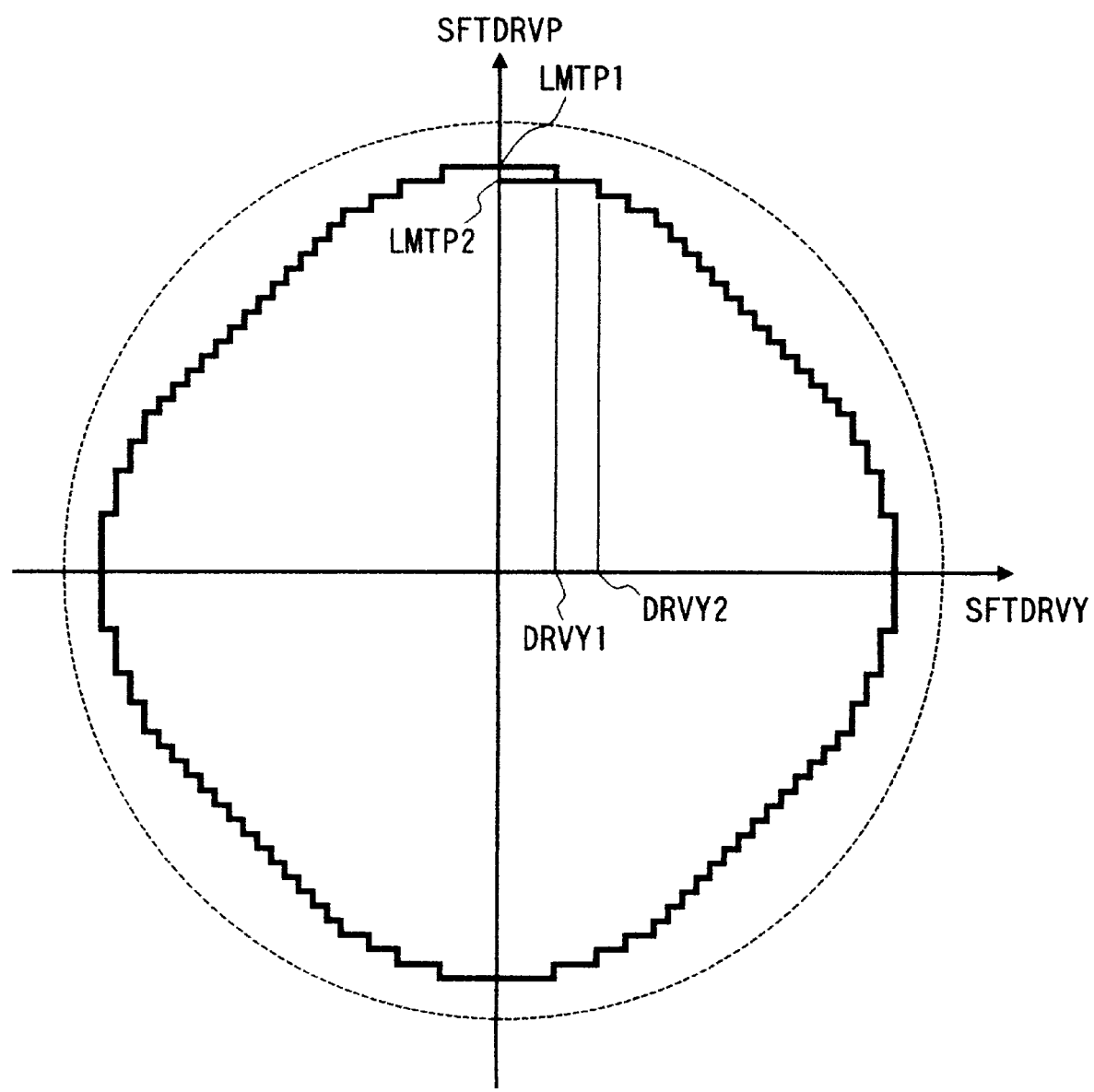
FIG. 9 is a view showing an example of the image blur correcting range in the third embodiment of the present invention.

FIG. 9 shows the drive data SFTDRVY for the yawing direction in the abscissa and the drive data SFTDRVP for the pitching direction in the ordinate. On the table data, the limit positions are set so that the limit position for SFTDRVP becomes LMTP1 in the case where SFTDRVY is within DRVY1 and that it becomes LMTP2 in the case where SFTDRVY is within DRVY2. Also, by selecting the limit positions in the yawing direction in a similar manner, there is obtained limit positions as represented by a solid line in FIG. 9, or an image blur correcting range. A broken-line area indicates the mechanical stroke end (image blur correcting range the in case where the electrical stroke limit positions are not defined).

As explained in the foregoing, suitable change in the values of the data table allows the stroke limit positions to be set separately in the pitching and yawing directions, thereby setting the image blur correcting range in various shapes (not only in a substantially circular shape but also in a rectangular shape or a polygonal shape as shown in FIG. 9) and thereby achieving image blur correction controls matching various photographing states.

In the present third embodiment, the stroke limit positions are set by the table data, but they may also be set by calculations.

Fourth Embodiment

A fourth embodiment switches both the image blur correcting characteristics and the image blur correcting range, using a switch SWISMODE for switching the image blur correcting mode.

The circuit configuration is the same as that of the second embodiment shown in FIG. 6, and will not, therefore, be explained further.

Figure 10:
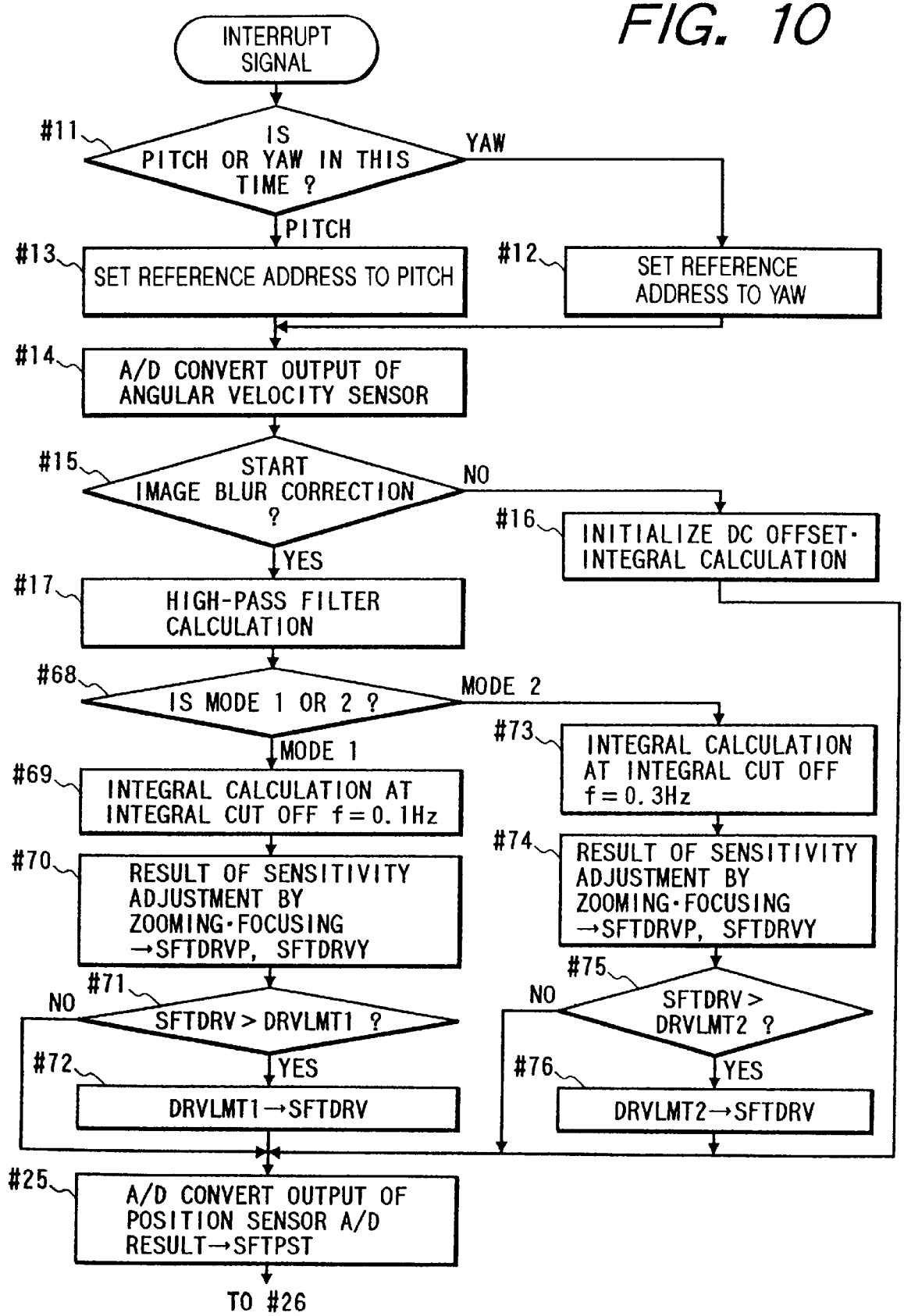
FIG. 10 is a flow chart showing an image blur correcting interrupt operation, to be executed by the lens microcomputer in the interchangeable lens, in a fourth embodiment of the present invention.

In the following there will be explained, with reference to a flow chart shown in FIG. 10, the functions of the present fourth embodiment. In the following description, description of parts similar to those in the foregoing second embodiment shown in FIG. 7 will be omitted, and only steps #68–#76, which are specific to the present fourth embodiment, will be explained. Also omitted is a part after step #25, as it is similar to that shown in FIG. 7:

[step #68] determines the mode 1 or 2, according to the state of the switch SWISMODE, and the sequence proceeds to a step #69 in the case of the mode 1;

[step #69] executes integration with a cut-off frequency of 0.1 Hz. As mode 1 is suitable for photographing a still object, the cut-off frequency of the integration is selected to be low;

[step #70] executes adjustment for the change in the amount of eccentricity (sensitivity) of the correction lens for the vibration angle, depending on the zoom and focus positions. This adjustment provides data SFTDRVY, SFTDRVP corresponding to the drive amounts of the correction lens;

[step #71], in mode 1, SFTDRV is compared with the stroke limit position DRVLMT1, and the sequence proceeds to step #25 if SFTDRVY is within DRVLMT1 but to step #72 if SFTDRVY exceeds DRVLMT1;

[step #72] writes DRVLMT1 into SFTDRV.

In the case where step #68 identifies mode 2, the sequence proceeds to step #73:

[step #73] executes integration with a cut-off frequency of 0.3 Hz. As mode 2 is suitable for photographing a moving object, the cut-off frequency of the integration is selected to be higher than in mode 1;

[step #74] executes adjustment for the change in the amount of eccentricity (sensitivity) of the correction lens for the vibration angle, depending on the zoom and focus positions. This adjustment provides data SPTDRVY, SFTDRVP corresponding to the drive amounts of the correction lens;

[step #75], in mode 2, SFTDRV is compared with the stroke limit position DRVLMT2, and the sequence proceeds to step #25 if SFTDRV is within DRVLMT2 but to step #76 if SFTDRVY exceeds DRVLMT2;

[step #76] writes DRVLMT2 into SFTDRV.

The optimum image blur correction control is rendered possible, since, according to the mode selected by the switch SWISMODE, both the image blur correcting characteristics and the image blur correcting range are selected to match the selected mode.

In the present fourth embodiment, in the case where mode 1 is selected by the switch SWISMODE, steps #69 and #70 are executed while steps #73 and #74 are executed in the case where mode 2 is selected, thereby achieving optimum image blur correction control.

Also the stroke limit position (image blur correcting range) may be set by a data table corresponding to the drive data of the other axis as in the foregoing third embodiment. In this manner the stroke limit positions can be selected separately for the pitching and yawing directions, thereby obtaining a correcting range of various shapes.

Also, the stroke limit position DRVLMT1 in mode 1 for taking the image of the still object may be selected, without the electrical limit position, so as to expand the correcting range to the mechanical stroke end. It is also possible, in a single mode, for example, to set an electrical stroke limit position for the pitching direction but not to set an electrical stroke limit position for the yawing direction, thereby expanding the correcting range to the mechanical stroke end.

In the present embodiment, mode 1 is selected for taking the image of a still object while mode 2 is selected for taking the image of a moving object, but there may be provided other modes such as a mode for photographing on a tripod and a mode for photographing while the photographer is walking, in addition to or in place of the above-mentioned modes.

As explained in the foregoing, the first to fourth embodiments of the present invention provide an optical equipment with image blur correcting function, capable of preventing collision of the correcting optical means with the end of the movable range of the mechanical structure, and securing a maximum image blur correcting range.

Also, the first to fourth embodiments of the present invention provide an optical equipment with image blur correcting function, capable of setting an optimum image blur correcting range for each operation state of the optical equipment.

Furthermore, the first to fourth embodiments of the present invention provide an optical equipment with image blur correcting function, capable of setting optimum image blur correcting characteristics and an optimum image blur correcting range for each operation state of the optical equipment.

Fifth Embodiment

Figure 11:
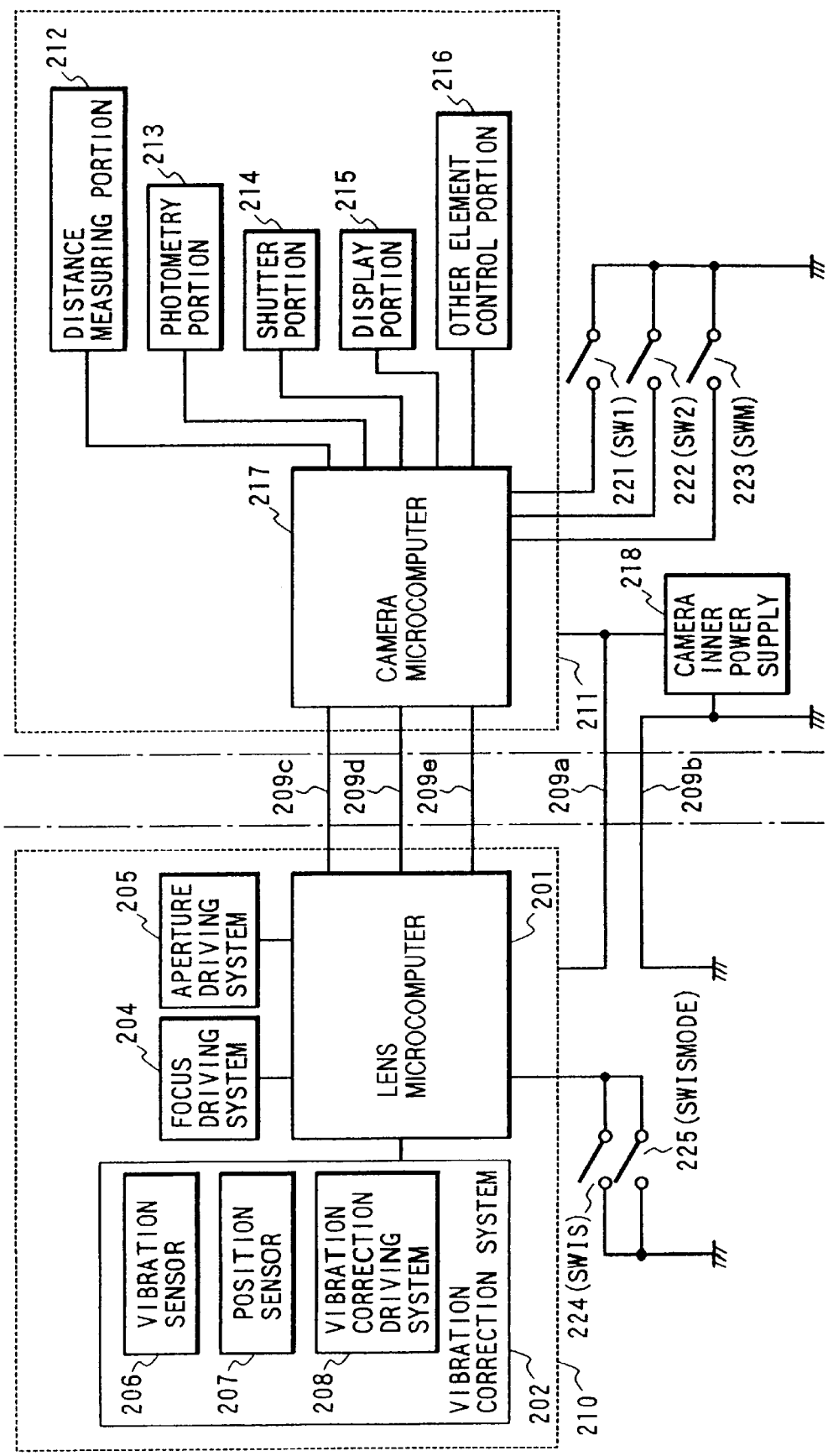
FIG. 11 is a block diagram showing the circuit configuration of a single lens reflex camera and an interchangeable lens constituting a fifth embodiment of the present invention.

FIG. 11 is a block diagram of a fifth embodiment of the present invention, wherein the image blur correcting function is applied to an interchangeable lens of a single lens reflex camera.

Referring to FIG. 11, a lens microcomputer 201 receives communication from the main body of the camera through communication lines 209c (for clock signals) and 209d (for transmitting lens signals from the main body of the camera), and drives, according to the instructions by such signals, a vibration correction system 202, a focus driving system 204 and an aperture driving system 205 of the configuration as shown in FIG. 19, and also controls the vibration correction system 202.

The vibration correction system 202 is composed of a vibration sensor 206 for detecting vibration, such as an angular movement sensor, a position sensor 207 for detecting the position of a correction lens, and a vibration correction driving system 208 for effecting image blur correction by driving the correction lens according to a drive signal calculated by the lens microcomputer 201 based on the outputs of the vibration sensor 206 and the position sensor 207.

An image blur correction starting switch (SWIS) 224 for executing an image blur correcting operation is turned on when an image blur correcting operation is selected. A switch (SWISMODE) 225 for switching the image blur correcting characteristics (hereinafter referred to as image blur correcting mode) can select an ordinary photographing mode (mode 1) or a moving object photographing mode (mode 2).

The focus driving system 204 executes a focusing operation by driving a focusing lens by an instruction from the lens microcomputer 201. The aperture driving system 205 executes an operation for closing the aperture to a predetermined aperture value or returning it to the fully-open state according to an instruction from the lens microcomputer 201.

The lens microcomputer 201 also executes transmission of lens status (zoom position, focus position, diaphragm aperture value, etc.) and information on the lens (fully-open aperture value, focal length, data required for distance measurement, etc.) to the main body of the camera, through a communication line 209e (for signal transmission from the lens to the main body of the camera).

A lens electrical system 210 is constituted by the lens microcomputer 201, the vibration correction system 202, the focus driving system 204 and the aperture driving system 205. Electric power is supplied to the lens electrical system 210 from the camera inner power supply 218, through a communication line 209a and a ground line 209b.

In the main body of the camera, there is provided an electrical system 211 including a distance measuring portion 212, a photometry portion 213, a shutter portion 214, a display portion 215, an other element control portion 216 and a camera microcomputer 217 for starting and stopping the functions of these portions and executing exposure calculation, distance calculation, etc. Electric power is supplied also to the electrical system 211 from the camera inner power supply 218.

A switch 221 (SW1) for initiating the photometry and the distance measurement and a shutter releasing switch 222 (SW2) for initiating a shutter releasing operation constitute 2-stroke switches, in which switch SW1 is turned on by a first stroke depression of a shutter release button and switch SW2 is turned on by a second stroke depression.

A switch 223 (SWM) is provided for selecting the exposure mode. A change in the exposure mode may be made by turning on and off this switch or by a simultaneous operation of this switch and another operation member.

The functions in the interchangeable lens of the camera of the above-explained configuration now will be explained.

Figure 12:
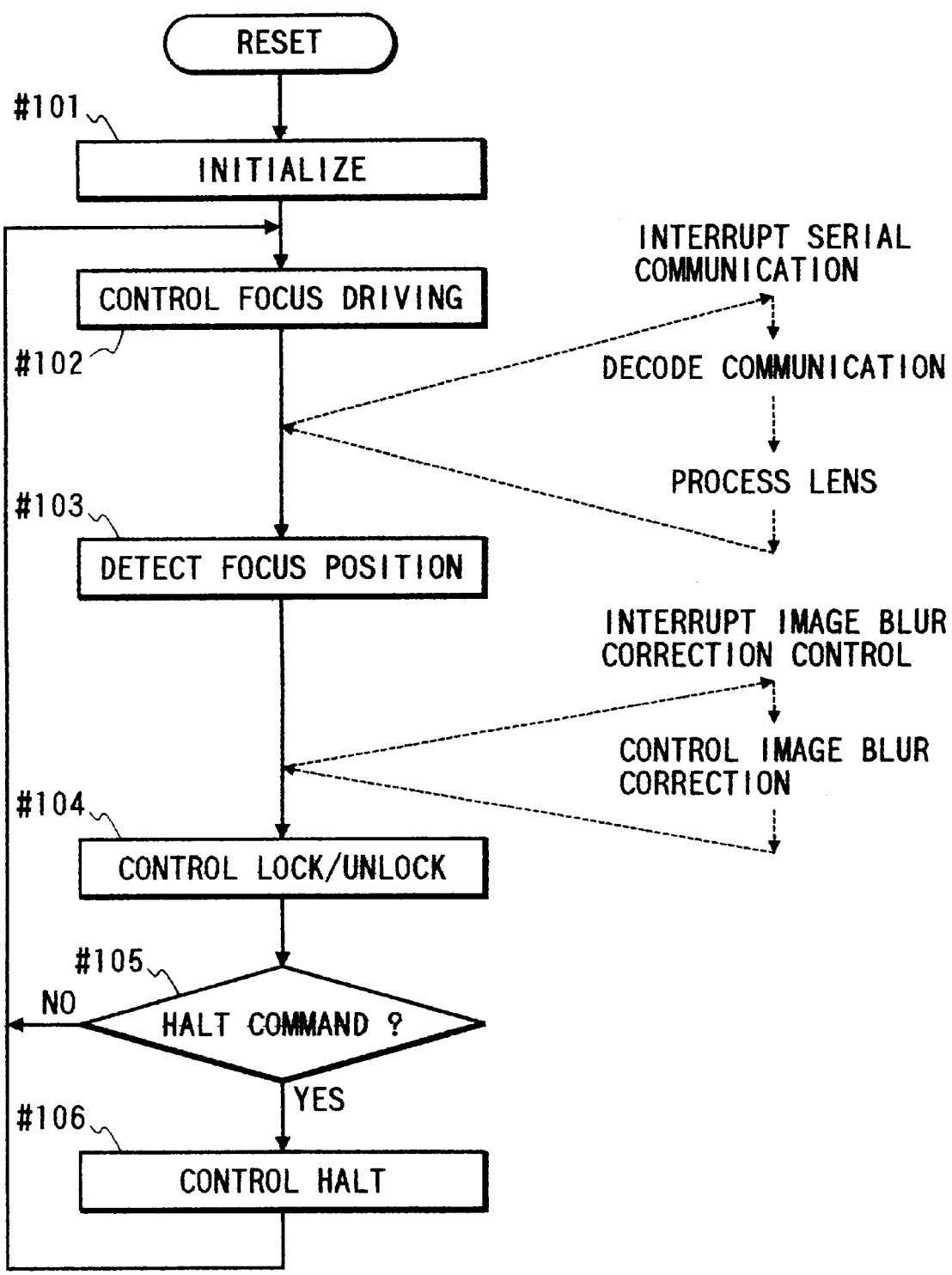
FIG. 12 is a flow chart showing the main operation flow of a lens microcomputer shown in FIG. 11.

The lens microcomputer 201 executes the aforementioned lens control according to a flow chart shown in FIG. 12. In the following the functions will be explained with reference to FIG. 12.

In response to any operation such as the closing of the switch SW1 of the camera, a communication is made from the camera main body (hereinafter simply referred to as the camera) to the interchangeable lens (hereinafter simply referred to as the lens) whereby the lens microcomputer 201 initiates the operation from a step #101:

[step #101] executes initialization for lens control and image blur correction control;

[step #102] executes a focus driving operation in response to a command from the camera;

[step #103] detects the zoom position and the focusing position;

[step #104] executes lock-unlock control of the support frame (correction lens) constituting the correcting optical means as explained before in relation to FIG. 28, according to the communication from the camera or the state of the switch SWIS;

[step #105] determines whether a HALT command (for stopping all the actuators in the lens) has been received from the camera, and, if not received, the sequence is repeated from step #102.

If step #105 determines that the HALT command has been received, the sequence proceeds to step #106:

[step #106] executes HALT control, in which all drive operations are suspended and the lens microcomputer 201 enters a sleep state.

If an interrupt for serial communication or for image blur correcting control is requested by a communication from the camera in the course of the above-mentioned operations, there is executed such interrupt process.

The interrupt process for serial communication executes decoding of communication data, and a lens process such as aperture drive. By decoding the communication data, there are identified a closing command for switch SW1 or SW2, the shutter time, the kind of the camera, etc.

Figure 13:
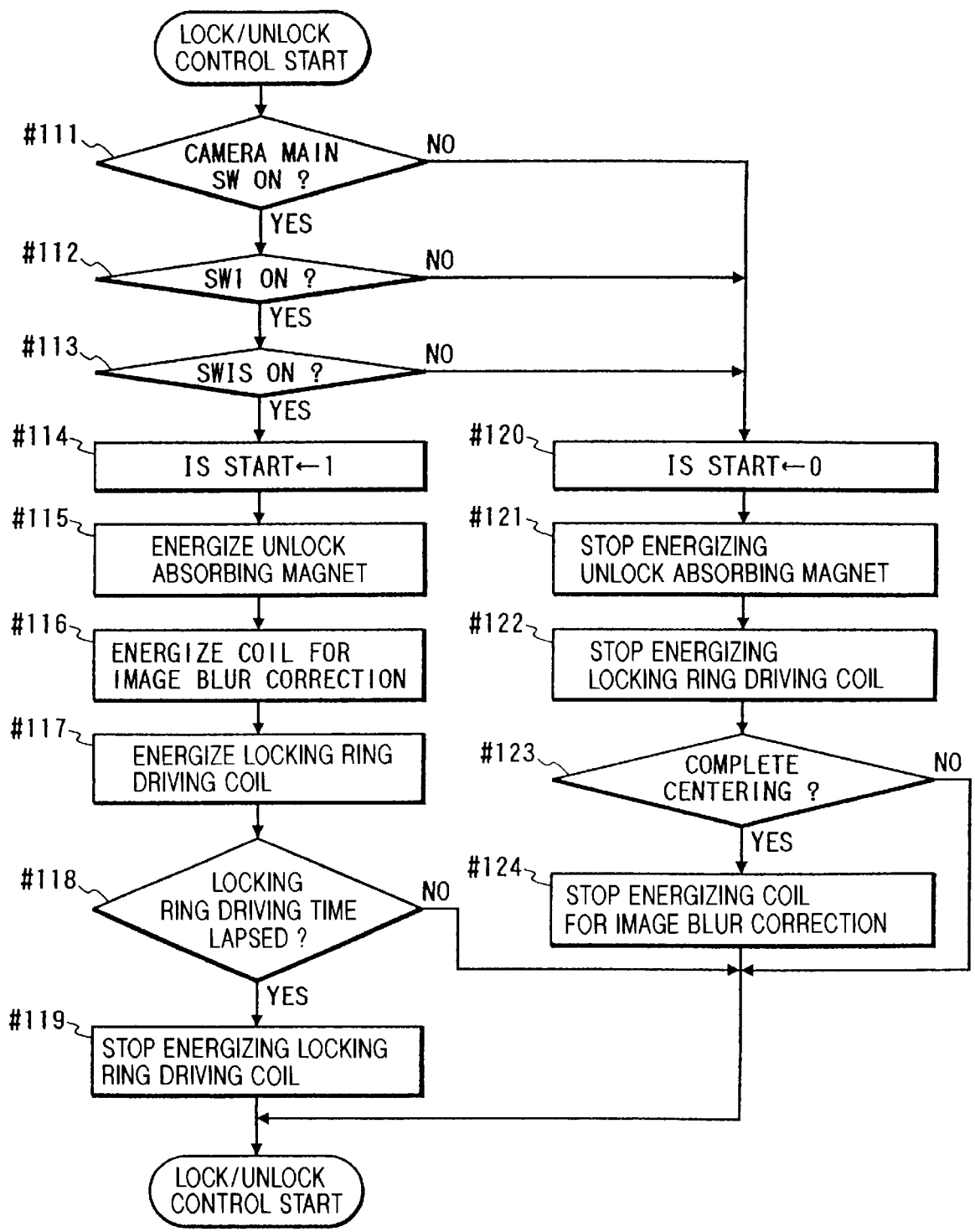
FIG. 13 is a flow chart showing a lock-unlock control to be executed by the lens microcomputer shown in FIG. 11.

In the following there will be explained the locking control, or the lock-unlock operation, executed in the above-mentioned step #104, with reference to a flow chart shown in FIG. 13. The image blur correcting device of the present embodiment is assumed to have the structure shown in FIG. 19. Also, the image blur correcting operation is assumed to be started when the main switch and the switches SW1 and SW2 of the camera are all turned on:

[step #111] determines whether the main switch of the camera is turned on, and, if on, the sequence proceeds to step #112;

[step #112] determines whether switch SW1 of the camera has been turned on, and, if on, the sequence proceeds to step #113;

[step #113] determines whether switch SWIS has been turned on, and, if on, the sequence proceeds to step #114.

Thus, an image blur correcting operation is started beginning at step #114 if the main switch of the camera and switches SW1, SW2 are all turned on. If any is off, there is executed an image blur correction terminating operation from step #120 as will be explained later:

[step #114] sets an image blur correction start flag IS START;

[step #115] energizes the unlocking attraction magnet, in order to retain the rotated state (unlocked state) of the locking ring against the force of the locking spring, as explained before in relation to FIG. 28;

[step #116] energizes the vibration correcting drive coil;

[step #117] energizes the locking ring drive coil, thereby rotating the locking ring;

[step #118] determines whether a locking ring drive time has elapsed. The locking ring drive time is selected so that the unlocked state can be retained by the unlocking attraction magnet, even when rotation of the locking ring is terminated in a following step #119. If the locking ring drive time has not elapsed, this subroutine is terminated and the same operations are repeated until the locking ring drive time elapses. When the lapse of the locking ring drive time is identified thereafter, the sequence proceeds to step #119:

[step #119] terminates the energization of the locking ring drive coil, whereby the unlocked state is attained.

On the other hand, if any of the main switch and switches SW1, SW2 of the camera is off, there is executed, as explained before, an image blur correction terminating operation beginning at step #120:

[step #120] clears the image blur correction start flag IS_START;

[step #121] stops energizing of the unlock absorbing magnet, whereby the locking ring rotates in the locking direction by way of the force of the locking spring, thereby realizing a locked stated;

[step #122] stops energizing of the locking ring drive coil, since it may be turned off in the course of driving the locking ring;

[step #123] determines whether a centering operation, for shifting the correction lens to the center position of the movable range, has been completed, and, if not, this subroutine is terminated and the same operations are repeated until the centering operation is completed. When the completion of the centering operation is subsequently identified, the sequence proceeds to step #119:

[step #124] stops energizing of the image blur correcting coil, since the correction lens is at the center of the movable range.

The lock-unlock operation is conducted in the above-explained manner.

The image blur correcting operating interrupt is a timer interrupt, generated at a constant interval (for example 500 msec). Since control in the vertical (pitching) direction and control in the horizontal (yawing) direction are executed alternately, the sampling interval for either direction is 1 msec. Though the control method (calculation coefficients, etc.) is the same for both directions, the results of the calculations are naturally different for the pitching and yawing directions. Consequently, a reference address is selected for each of the pitching and yawing directions, and data such as the results of calculations are designated by indirect addresses of the RAM, and the reference address is switched between control in the pitching direction and control in the yawing direction.

Figure 14:
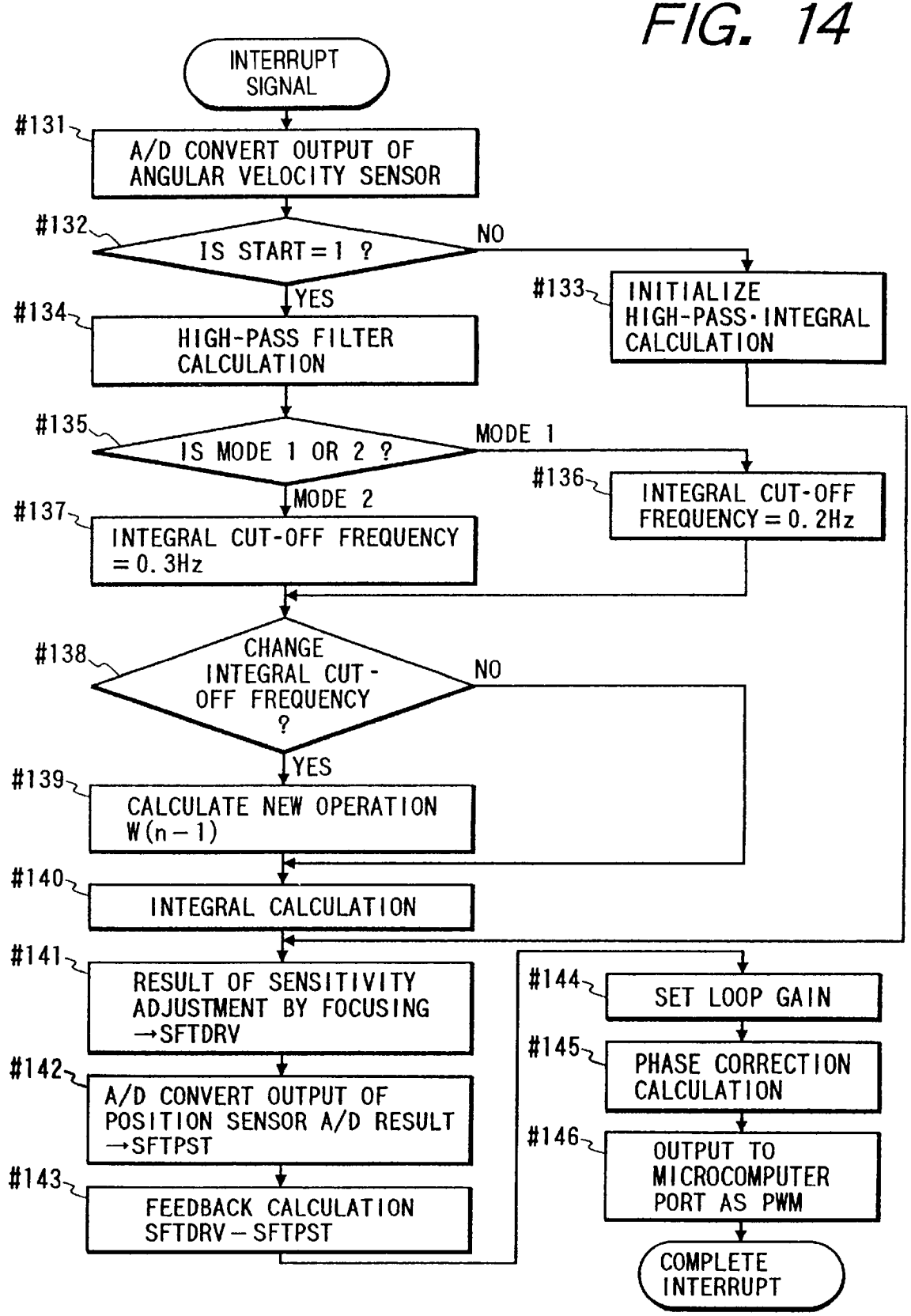
FIG. 14 is a flow chart showing an image blur correcting interrupt operation, to be executed by the lens microcomputer shown in FIG. 11.

In the case where an image blur correcting operation interrupt is generated in the course of a main operation of the camera, the lens microcomputer 201 starts the image blur correcting control beginning at step #131 shown in FIG. 14:

[step #131] executes A/D conversion on the output of the angular velocity sensor for detecting the vibration applied to the interchangeable lens (camera);

[step #132] determines whether an image blur correction start command has been received, and if not, the sequence proceeds to step #133;

[step #133] executes initialization of high-pass filter calculation or integration, because the image blur correction is not executed, and the sequence proceeds to step #141.

If step #132 identifies the reception of the image blur correction start command, the sequence proceeds to step #134:

[step #134] executes the high-pass filter calculation for the image blur correction, and also executes relaxation of the image vibration at the start-up phase, by switching the time constant for 2 to 3 seconds from the start of the image blur correction;

[step #135] determines whether the image blur correction is in mode 1 (ordinary photographing mode) or in mode 2 (moving object photographing mode), and the sequence proceeds to step #136 or #137 respectively in the case of mode 1 or 2.

[step #136] image blur correction mode is in mode 1, sets the integration cut-off frequency at 0.2 Hz;

[step #137] image blur correction mode is in mode 2, sets the integration cut-off frequency at 0.3 Hz.

After the above-mentioned setting of the integration cut-off frequency, the sequence proceeds to step #138:

[step #138] determines whether the image blur correction mode has been switched, namely whether the integration cut-off frequency has been changed in the course of the image blur correcting operation, and, if not, the sequence proceeds to step #140, but, if changed, the sequence proceeds to [a] step #139;

[step #139] recalculates the integrating operator W(n−1) by the changed integrating coefficient (as countermeasure for transient response).

In the following there will be given an explanation of the integrating calculation.

The digital integration is executed according to the following equation:

$$\begin{cases} W(n) = X(n) - B1 \times W(n-1) & (1) \\ Y(n) = A0 \times W(n) + A1 \times W(n-1) & (2) \end{cases}$$

wherein X(n): input
Y(n): output
W(n), W(n−1): operators
A0, A1, B1: integrating coefficients
n: current sampling As a change in the integrating cut-off frequency results in changes in the integrating coefficients A0, A1 and B1 (the changed integrating coefficients being represented by A0', A1' and B1'), a transient response is generated if the integration is conducted with the operator W(n−1) determined by the integrating coefficients before the change and with the changed integrating coefficients. Therefore, in order to avoid such transient response, the operator W(n−1) has to be recalculated so as to obtain a result the same as in the preceding integration.

The new operator W(n−1) can be obtained by erasing W(n) from the equations (1) and (2):

$$W(n-1) = \frac{1}{A1' - A0' \times B1'} Y(n) - \frac{A0'}{A1' - A0' \times B1'} X(n) \quad (3)$$

In this manner the operator W(n−1) can be determined from the new integrating coefficients:

[step #140] executes integration for the set characteristics to obtain angular displacement data θ. The integrating characteristics set in step #136 or #137 are for the firmly hand-held ordinary situation, and the integrating cut-off frequency is switched according to the angular displacement of vibration in the case of a panning operation;

[step #141] executes adjustment for the change in the amount of eccentricity (sensitivity) of the correction lens for the vibration angle, depending on the focus position. More specifically, the focus position is divided into a certain number of zones, and average sensitivity (deg/mm) in each zone is read from a data table and converted into the correction lens drive data. The obtained result is stored in a RAM area set by SFTDRV in the microcomputer;

[step #142] executes A/D conversion on the output of the position sensor for the correction lens, and stores the result of the A/D conversion in a RAM area set by SFTPST in the microcomputer;

[step #143] executes a feedback calculation (SFTDRV−SFTPST);

[step #144] multiplies the result of the feedback calculation with the loop gain;

[step #145] executes a phase compensating calculation for realizing a stable control system;

[step #146] outputs the result of the phase compensating calculation as a PWM signal to the port of the microcomputer, whereupon the interruption process is terminated.

The above-mentioned output is supplied to the vibration correction driving system 208 in the vibration correction system 202, whereby the correction lens is driven to achieve image blur correction.

As explained in the foregoing, if the image blur correction mode is switched in the course of an image blur correcting operation, the steps #138 and #139 redetermine the integrating operator W(n−1) with the new integrating coefficients in such a manner that the integrating operations provide the same results before and after the change of the integrating time constant, whereby a transient response (abrupt change in the image) can be reduced and variation in the image resulting from mode switching can be relaxed.

In the present embodiment, if the image blur correction mode is switched in the course of the image blur correcting operation, the integrating operator W(n−1) is redetermined with the new integrating coefficients, but it is also possible to suppress the abrupt change of the image by varying the coefficients at the phase compensating calculation.

Sixth Embodiment

In the present sixth embodiment, if the image blur correction mode is switched in the course of the image blur correcting operation, a change in the image is relaxed by storing the difference between the results of integrations before and after such switching and, in a subsequent sampling, by adding or subtracting the stored difference to or from the result of integration.

The circuit configuration, being the same as that in the foregoing fifth embodiment, will not be explained further.

Figure 15:
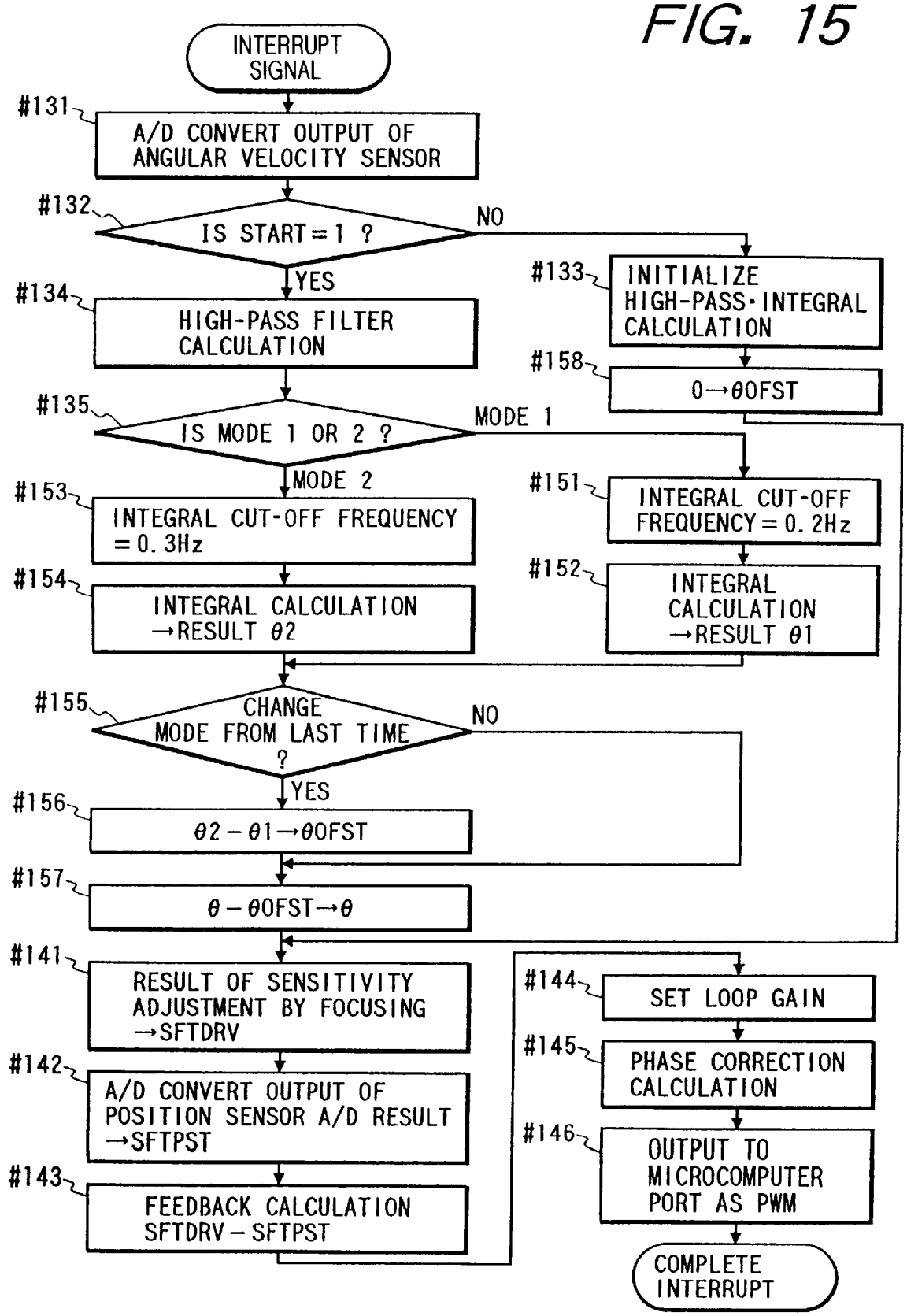
FIG. 15 is a flow chart showing an image blur correcting interrupt operation, to be executed by the lens microcomputer in the interchangeable lens, in a sixth embodiment of the present invention.

In the following the functions of the present sixth embodiment will be explained with reference to a flow chart shown in FIG. 15. In the following description, discussion of parts which are the same as those of the foregoing fifth embodiment shown in the flow charts in FIGS. 13 and 14 will be omitted, and only a part specific to the sixth embodiment, namely steps #151 to #158 which constitute the difference between FIGS. 15 and 14 will be explained:

[step #151], in mode 1, sets the integrating cut-off frequency at 0.2 Hz;

[step #152] executes integration to obtain angular displacement data θ1 as a result, and the sequence proceeds to step #155;

[step #153], in mode 2, sets the integrating cut-off frequency at 0.3 Hz;

[step #154] executes integration to obtain angular displacement data θ2 as a result, and the sequence proceeds to step #155;

[step #155] determines whether the image blur correction mode has been changed from that in the preceding sampling, and the sequence proceeds to a step #156 or #157, respectively, if the mode has been changed or not;

[step #156] stores the difference between the angular displacement data e1 and e2 as θOFST;

[step #157] subtracts θOFST from the result θ of the current integration to obtain new angular displacement data θ;

[step #158] sets θOFST as an initialization of the calculation.

As explained in the foregoing, θOFST is cleared to 0 in the initialization of calculation, and, if the image blur correction mode is switched in the course of the image blur correcting operation, there is retained the difference θOFST of the angular displacement data between the current and preceding image blur correcting operations, and, in the subsequent sampling, such difference is subtracted to avoid an abrupt change in the angular displacement data at the mode switching, thereby suppressing change in the image.

Seventh Embodiment

In the present seventh embodiment, in the case where the image blur correction mode is switched in the course of an image blur correcting operation, and, if a variation in the image is anticipated to remain after the operations of the foregoing fifth embodiment, the image blur correcting control is retained unchanged. For example, even when the image blur correction mode is switched from mode 1 to mode 2, the image blur correction control remains in mode 1 if the time constant shows a large change.

The circuit configuration, being the same as that in the foregoing fifth embodiment, will not be explained further.

Figure 16:
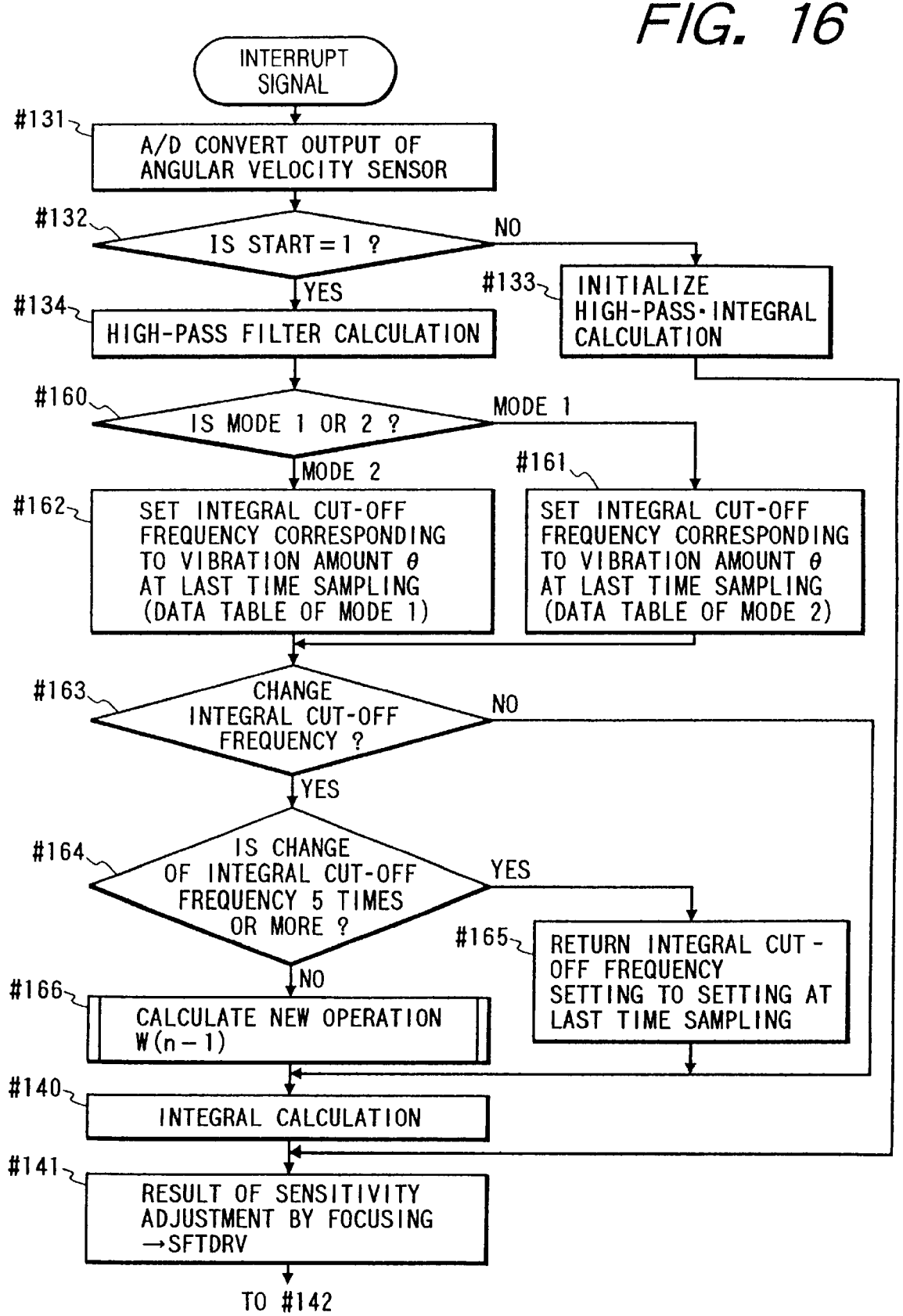
FIG. 16 is a flow chart showing an image blur correcting interrupt operation, to be executed by the lens microcomputer in the interchangeable lens, in a seventh embodiment of the present invention.

In the following the functions of the present seventh embodiment will be explained with reference to a flow chart shown in FIG. 16. In the following description, description of parts the same as those of the forgoing fifth embodiment shown in the flow charts in FIGS. 13 and 14 will be omitted, and only a part specific to the seventh embodiment, namely steps #160–#166 which constitute the difference between FIG. 16 and 14 will be explained. Also omitted is the sequence starting at step #142:

[step #160] determines whether the switch SWISMODE is in the mode 1 or mode 2, and, if in mode 1, the sequence proceeds to step #161;

[step #161] executes panning control for varying the cut-off frequency of integration according to the amount of vibration. More specifically, based on the vibration amount θ determined in the preceding sampling, the integrating cut-off frequency is read from table data for setting the integrating cut-off frequency of mode 1. The table data are set so that the integrating cut-off frequency becomes larger as the vibration amount θ increases.

If step #160 determines that the switch SWISMODE is in mode 2, the sequence proceeds to step #162:

[step #162] executes, as in the foregoing step #161, panning control for varying the cut-off frequency of integration according to the amount of vibration. More specifically, based on the vibration amount θ determined in the preceding sampling, the integrating cut-off frequency is read from table data for setting the integrating cut-off frequency of mode 2. As mode 2 is for taking the image of a moving object, the table data are selected to be larger than those of mode 1, in order to achieve improved control for the panning operation;

[step #163] determines whether the integrating cut-off frequency has been changed, and the sequence proceeds to step #140 or #164, respectively, if the cut-off frequency has been changed or not;

[step #164] determines whether the change of the integrating cut-off frequency is, for example, at least 5 times, and, if so, the sequence proceeds to step #165. A change of 5 times is, for example, a change of the integrating cut-off frequency from 0.2 Hz to 1 Hz;

[step #165] restores the integrating cut-off frequency of the preceding sampling, as the change in the integrating cut-off frequency is at least 5 times, and the sequence proceeds to step #140 for executing an integration operation.

If step #164 determines that the change in the integrating cut-off frequency is less than 5 times, the sequence proceeds to step #166:

[step #166] re-calculates, as the change in the integrating cut-off frequency being less than 5 times, the integrating operator with the coefficients corresponding to the new integrating cut-off frequency as explained in the preceding embodiment, thereby relaxing the transient response.

As explained in the foregoing, when the image blur correction mode is switched in the course of an image blur correcting operation (YES in step #163), if the integrating cut-off frequency changes at least by a predetermined value (YES in step #164) so that a change in the image cannot be relaxed (YES in step #164), the integrating cut-off frequency is retained unchanged (step #165) so that a change in the image is not generated. On the other hand, if the change is less than a predetermined value (NO in step #164), a measure for the transient response is adopted (step #166) to relax the change in the image.

Eighth Embodiment

In the present eighth embodiment, the image blur correction control is not changed even when the image blur correction mode is switched in the course of an image blur correcting operation. For example, even when the image blur correction mode is switched from mode 1 to mode 2, the image blur correction control is retained at mode 1.

The circuit configuration, being the same as that in the foregoing fifth embodiment, will not be explained further.

Figure 17:
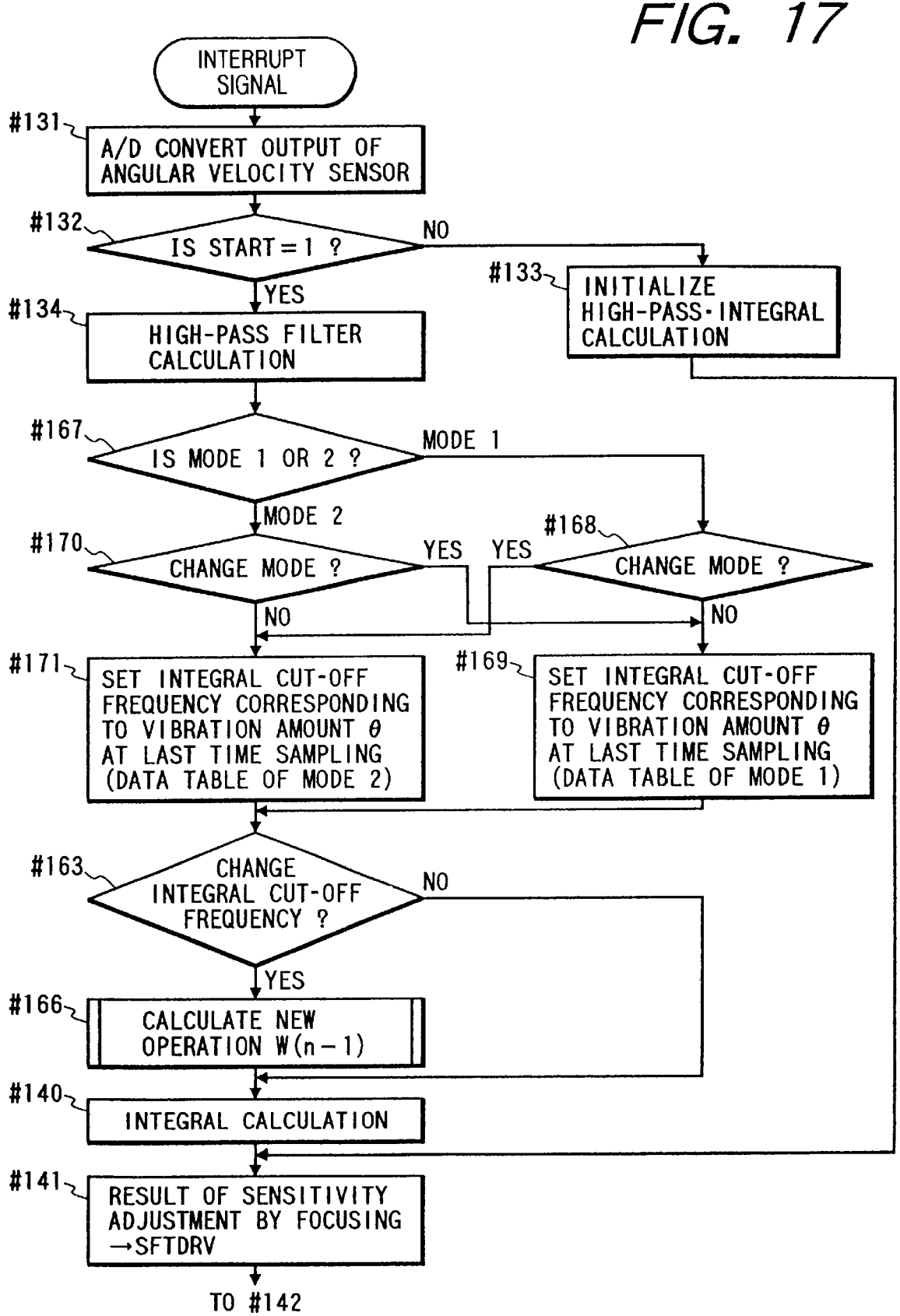
FIG. 17 is a flow chart showing an image blur correcting interrupt operation, to be executed by the lens microcomputer in the interchangeable lens, in an eighth embodiment of the present invention.
Figure 18:
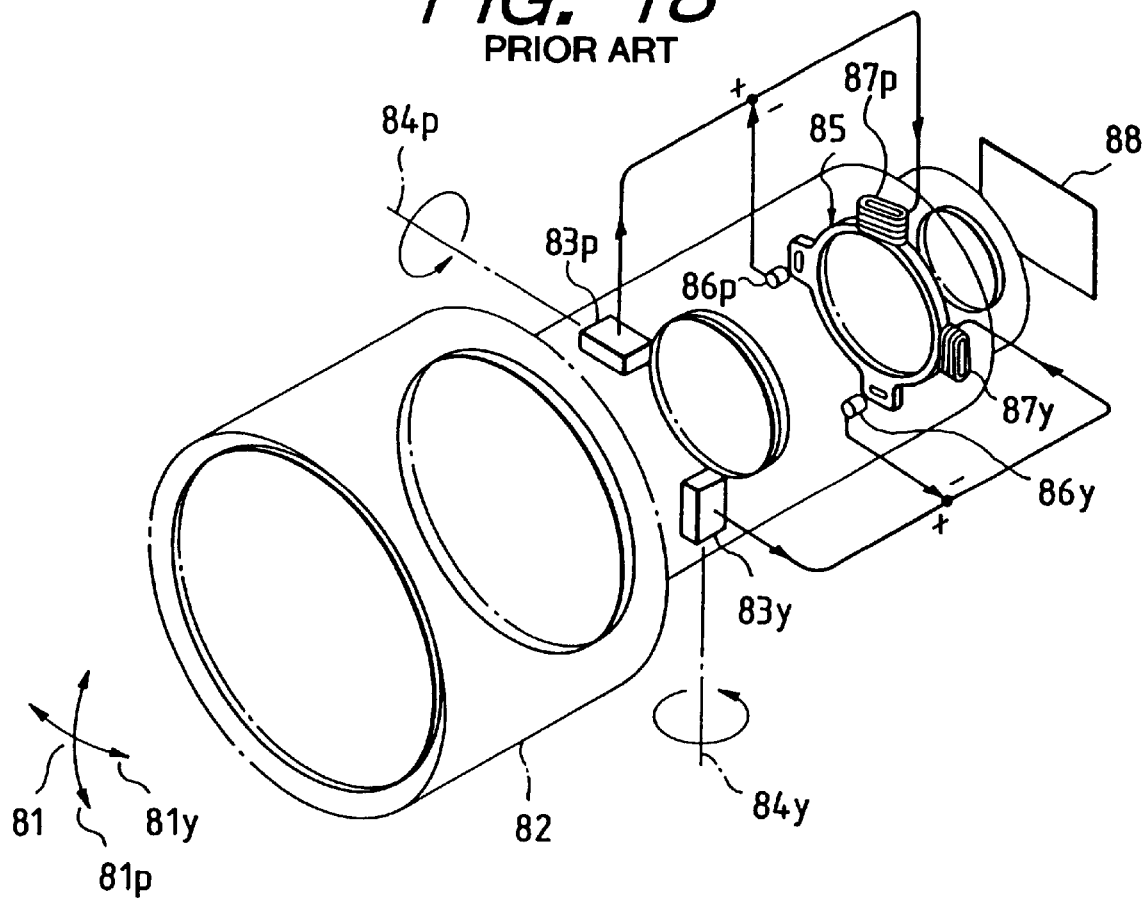
FIG. 18 is a perspective view showing the schematic configuration of a conventional vibration preventing system.

In the following the functions of the present eighth embodiment will be explained with reference to a flow chart shown in FIG. 17. In the following description, description of parts which are the same as those of the foregoing seventh embodiment will be omitted, and only a part specific to the eighth embodiment, namely steps #167–#171 which constitute the difference between FIG. 17 and 16 will be explained. Also omitted is a sequence starting at step #142:

[step #167] determines whether the switch SWISMODE is in mode 1 or mode 2, and, if in mode 1, the sequence proceeds to step #168;

[step #168] determines whether the mode is different from that of the preceding sampling, namely whether the mode has been switched from mode 2 to mode 1, and the sequence proceeds to step #171 or #169, respectively, if the mode is different or not;

[step #169] executes panning control for varying the cut-off frequency of integration according to the amount of vibration. More specifically, based on the vibration amount e determined in the preceding sampling, the integrating cut-off frequency is read from table data for setting the integrating cut-off frequency of the mode 1. The table data are set so that the integrating cut-off frequency becomes larger as the vibration amount θ increases.

If step #167 determines that the switch SWISMODE is in mode 2, the sequence proceeds to step #170:

[step #170] determines whether the mode is different from that of the preceding sampling, namely whether the mode has been switched from mode 1 to mode 2, and the sequence proceeds to step #169 or #171, respectively, if the mode is different or not;

[step #171] executes, as in the foregoing step #169, panning control for varying the cut-off frequency of integration according to the amount of vibration. More specifically, based on the vibration amount θ determined in the preceding sampling, the integrating cut-off frequency of mode 2. As mode 2 is for taking the image of a moving object, the table data are selected larger than those of mode 1, in order to achieve improved control for the panning operation.

As explained in the foregoing, even when the image blur correction mode is switching in the course of an image blur correcting operation, the image blur correction control is retained unchanged from the control prior to such switching, so that a change in the image is not generated.

In the foregoing fifth to seventh embodiments, the change in the image can be relaxed since a measure by calculation is adopted against the transient response even if the image blur correction mode is switched in the course of the image blur correcting operation.

Also in the foregoing seventh embodiment, if a change in the image is anticipated to remain even after the above-mentioned measure, the image blur correction control is not changed even when the image blur correction mode is switched, so that a change in the image is not generated. Also in such case, the image blur correction control is switched only after the image blur correcting operation in the current sampling operation is terminated (completed), so that the measure against the transient response is made in the switched mode in the subsequent image blur correcting operation. Consequently the operability of the system can be improved.

Also in the eighth embodiment, the image blur correction control is not changed in the course of the image blur correcting operation even if the image blur correction mode is switched, so that a change in the image is not generated.

As explained in the foregoing, the fifth to eighth embodiments can provide an optical equipment with image blur correcting function, which can relax the abrupt change in the image, thereby relieving the observer from the unpleasant feeling even if an operation for switching the image blur correcting characteristics is executed in the course of the image blur correcting operation.

Also, the fifth to eighth embodiments can provide an optical equipment with image blur correcting function, which realizes a control state that does not generate an image change itself thereby relieving the observer from an unpleasant feeling, in a case where the abrupt change in the image cannot be relaxed, even if an operation for switching the image blur correcting characteristics is executed.

Furthermore, the fifth to eighth embodiments can provide an optical equipment with image blur correcting function, which realizes a control state that does not generate the image change itself thereby relieving the observer from an unpleasant feeling, even if an operation for switching the image blur correcting characteristics is executed in the course of the image blur correcting operation.

Variations

In the foregoing embodiments, the controls for the pitching direction and the yawing direction are combined in a single program, but these controls may be executed separately. Also, analog control may be adopted instead of the digital control employed in the foregoing embodiments.

Also in the foregoing embodiments, the image blur correcting device is incorporated in an interchangeable lens, but it may also be incorporated in an adapter such as an extender to be inserted between the camera and the lens, or an accessory such as a conversion lens to be mounted in front of the interchangeable lens.

It can also be applied to other cameras such as a lens-shuttered camera or a video camera, other optical instruments such as binoculars, other devices or a component unit.

Also in the foregoing embodiments, the vibration sensor is composed of an angular velocity sensor, but it may also be composed of any means capable of detecting vibration, such as an angular acceleration sensor, an acceleration sensor, a velocity sensor, an angular displacement sensor, a displacement sensor or a method of detecting the image vibration itself.

The individual components shown in schematic or lock form in the drawings are all well known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur preventing device for use with an apparatus and a vibration sensor that detects a vibration state of the apparatus and generates a vibration signal that varies in accordance with the vibration state detected by the vibration sensor, said image blur preventing device comprising:

a movable portion movable in a first direction and in a second direction, perpendicular to the first direction, for performing image blur prevention;

a driving device that drives said movable portion to move in accordance with the vibration signal of the vibration sensor; and drive control means for controlling a driving operation of said driving device such that a maximum driving range of said movable portion in the first direction is different from a maximum driving range in the second direction.

2. An image blur preventing device according to claim 1, wherein the first direction coincides with a direction of gravitational force.

3. An image blur preventing device according to claim 1, wherein, when the vibration signal is larger than a predetermined signal corresponding to the maximum driving range, said driving control means controls said driving device on the basis of the predetermined signal.

4. An image blur preventing device according to claim 2, wherein the maximum driving range in the first direction is smaller than the maximum driving range in the second direction.

5. An image blur preventing device for use with an apparatus and a vibration sensor that detects a vibration state of the apparatus and generates a vibration signal that varies in accordance with the vibration state detected by the vibration sensor, said image blur preventing device comprising:

a movable portion movable for performing image blur prevention;

a filter portion that cuts off predetermined frequency components of the vibration signal and outputs a filtered vibration signal, said filter portion having a variable cut-off frequency;

a driving device that drives said movable portion to move in accordance with the filtered vibration signal output by said filter portion;

a regulating portion that regulates an operation range of said movable portion to a predetermined range by regulating a driving operation of said driving device in accordance with the filtered vibration signal; and a variable portion that controls said regulating portion to vary the operation range of said movable member in accordance with variation in the cut-off frequency of said filter portion.

6. An image blur preventing device according to claim 5, wherein said filter portion comprises a high-pass filter.

7. An image blur preventing device according to claim 6, wherein the variable cut-off frequency may be set to one of at least a first cut-off frequency and a second cut-off frequency higher than the first cut-off frequency, and said variable portion controls said regulating portion so as to set the operation range of the movable portion at a first range when the cut-off frequency is set at the first cut-off frequency and controls the regulating portion so as to set the operation range of the movable portion at a second range, smaller than the first range, when the cut-off frequency is set at the the second cut-off frequency.

8. An image blur preventing device for use with an apparatus and a vibration sensor that detects a vibration state of the apparatus and generates a vibration signal that varies in accordance with the vibration state detected by the vibration sensor, said image blur preventing device comprising:

a movable portion movable for performing image blur prevention;

an integrating portion that integrates the vibration signal of the vibration sensor and generates an integrated vibration signal, said integrating portion having variable integrating characteristics;

a driving device that drives said movable portion to move in accordance with the integrated vibration signal output by said integrating portion;

a regulating portion that regulates the operation range of said movable portion to a predetermined range by regulating a driving operation of said driving device in accordance with the integrated vibration signal; and a variable portion that controls said regulating portion to vary the operation range of said movable portion in accordance with variation in the integrating characteristics of said integrating portion.

9. An image blur preventing device according to claim 8, wherein said integrating portion has a variable cut-off frequency, and said variable portion controls said regulating portion to vary the operation range of said movable portion in accordance with variation in the cut-off frequency.

10. An image blur preventing device according to claim 9, wherein the variable cut-off frequency may be set to one of at least a first cut-off frequency and a second cut-off frequency higher than the first cut-off frequency, and said variable portion controls said regulating portion to set the operation range of said movable portion at a first range when the cut-off frequency is set at the first cut-off frequency and controls said regulating portion to set the operation range of said movable portion at a second range, smaller than the first range, when the cut-off frequency is set at the second cut-off frequency.

11. An image blur preventing device for use with an apparatus and a vibration sensor that detects a vibration state of the apparatus and generates a vibration signal that varies in accordance with the vibration state detected by the vibration sensor, said image blur preventing device comprising:

an image blur prevention portion that performs a first image blur preventing operation in a first direction and a second image blur preventing operation in a second direction, perpendicular to the first direction, to perform image blur prevention;

a driving device that drives said image blur prevention portion in accordance with the vibration signal of the vibration sensor; and drive control means for controlling a driving operation of said driving device such that a maximum driving range in the first direction is different from a maximum driving range of said image blur prevention portion in the second direction.

12. An image blur preventing device according to claim 11, wherein the first direction coincides with a direction of gravitational force.

13. An image blur preventing device according to claim 11, wherein, when the vibration signal is larger than a predetermined signal corresponding to the maximum driving range, said driving control means controls said driving device on the basis of the predetermined signal.

14. An image blur preventing device according to claim 13, wherein the maximum driving range in the first direction is smaller than the maximum driving range in the second direction.

15. An image blur preventing device for use with an apparatus and a vibration sensor that detects a vibration state of the apparatus and generates a vibration signal that varies in accordance with the vibration state detected by the vibration sensor, said image blur preventing device comprising:

an image blur preventing portion that performs an image blur prevention operation;

a filter portion that cuts off predetermined frequency components of the vibration signal of the vibration sensor and outputs a filtered vibration signal, said filter portion having a variable cut-off frequency;

a driving device that drives said image blur prevention portion in accordance with the filtered vibration signal of said filter portion;

a regulating portion that regulates an operation range of said image blur prevention portion to a predetermined range by regulating a driving operation of said driving device in accordance with the filtered vibration signal; and a variable portion that controls said regulating portion to vary the operation range of said image blur preventing portion in accordance with variation in the cut-off frequency of said filter portion.

16. An image blur preventing device for use with an apparatus and a vibration sensor that detects a vibration state of the apparatus and generates a vibration signal that varies in accordance with the vibration state detected by the vibration sensor, said image blur preventing device comprising:

an image blur prevention portion that performs an image blur preventing operation;

an integrating portion that integrates the vibration signal of the vibration sensor and outputs an integrated vibration signal, said integrating portion having a variable integration characteristic;

a driving device that drives said image blur prevention portion in accordance with the integrated vibration signal of said integrating portion;

a regulating portion that regulates an operation range of said image blur prevention portion to a predetermined range by regulating a driving operation of said driving device in response to the integrated vibration signal; and a variable portion that controls said regulating portion to vary the operation range in accordance with variation in the integrating characteristic of said integrating portion.

17. An image blur preventing device for use with an apparatus and a vibration sensor that detects a vibration state of the apparatus and generates a vibration signal that varies in accordance with the vibration state detected by the vibration sensor, said image blur preventing device comprising:

an image blur prevention portion that performs an image blur preventing operation;

a driving device that drives said image blur prevention portion in accordance with the vibration signal;

a selection member selectively operable in a first mode, in which a first image blur prevention operation is performed, and a second mode, in which a second image blur prevention operation is performed; and control means for controlling a drive operation of said driving device so that maximum driving ranges of said image blur prevention portion in the first mode and the second mode are different from each other.

* * * * *

UNITED STATES PATENT AND TRADEMARK OFFICE
CERTIFICATE OF CORRECTION

PATENT NO. : 6,208,810 B1
DATED : March 27, 2001
INVENTOR(S) : Shinji Imada

It is certified that error appears in the above-identified patent and that said Letters Patent is hereby corrected as shown below:

Column 5,
Line 20, "7812*p*" should read -- 78i2*p* --.

Column 16,
Line 47, "[step #181]" should read -- [step #18] --.

Column 26,
Line 56, "e1 and e2 as EOFST" should read -- $\theta 1$ and $\theta 2$ as $\theta$OFST --.

Column 28,
Line 48, "e" should read -- $\theta$ --.

Signed and Sealed this

Twenty-second Day of January, 2002

Attest:

JAMES E. ROGAN
Attesting Officer
Director of the United States Patent and Trademark Office